(12) United States Patent
Singh et al.

(10) Patent No.: US 7,801,040 B1
(45) Date of Patent: Sep. 21, 2010

(54) NODE REGISTRATION TECHNIQUE IMPLEMENTED IN ACCESS NETWORKS

(75) Inventors: Hemant Singh, Westford, MA (US); De Fu Li, Wayland, MA (US); Mark Millet, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 403 days.

(21) Appl. No.: 11/865,520

(22) Filed: Oct. 1, 2007

(51) Int. Cl.
 *H04J 1/16* (2006.01)
(52) U.S. Cl. .................................. 370/230.1; 725/118
(58) Field of Classification Search ........................ None
 See application file for complete search history.

(56) References Cited

U.S. PATENT DOCUMENTS

| | | | |
|---|---|---|---|
| 6,614,799 B1 * | 9/2003 | Gummalla et al. | 370/448 |
| 6,693,878 B1 | 2/2004 | Daruwalla et al. | |
| 7,110,419 B1 | 9/2006 | Linander | |
| 7,583,704 B1 | 9/2009 | Walker et al. | |
| 7,602,820 B2 * | 10/2009 | Helms et al. | 370/535 |
| 2004/0208120 A1 | 10/2004 | Shenoi | |
| 2004/0221032 A1 | 11/2004 | Bernstein et al. | |
| 2006/0130113 A1 * | 6/2006 | Carlucci et al. | 725/118 |
| 2010/0061234 A1 | 3/2010 | Pai et al. | |
| 2010/0061235 A1 | 3/2010 | Pai et al. | |

OTHER PUBLICATIONS

Pai et al., "QOS and Scheduling Techniques for Bonded Channels in Cable Networks," U.S. Appl. No. 61/191,026, filed Sep. 5, 2008.

Data-Over-Cable Service Interface Specifications ("DOCSIS") 2.0, Radio Frequency Interface Specification, CM-SP-RFIv2.0-I11-060602, Copyright 1999-2006 Cable Television, Inc., 533 pages.
Data-Over-Cable Service Interface Specifications ("DOCSIS") 3.0, Radio Frequency Interface Specification, CM-SP-MULPIv3.0-I05-070803, Copyright 2006-2007 Cable Television, Inc., 743 pages.
Data-Over-Cable Service Interface Specification ("DOCSIS") 3.0, MAC and Upper Layer Protocols Interface Specification, CM-SP-MULPIv3.0-I02-061222, Copyright 2006 Cable Television, Inc. 734 pages.
PCT Search Report dated Oct. 15, 2009 issued in Application No. PCT/US2009/042411.
PCT Written Opinion dated Oct. 15, 2009 issued in Application No. PCT/US2009/042411.

* cited by examiner

*Primary Examiner*—Phuc Tran
(74) *Attorney, Agent, or Firm*—Weaver Austin Villeneuve & Sampson LLP

(57) ABSTRACT

In one embodiment a technique is disclosed for facilitating communication between nodes and a head end of an access network including a head end, at least one shared access upstream channel and at least one downstream channel. A first insertion rate estimate is determined. In at least one embodiment, the first insertion rate estimate may relate to an estimated number of nodes attempting to sign-on to the access network during one or more time interval(s). In at least one embodiment, a frequency of occurrence of initial maintenance opportunities available to a first plurality of network nodes may be dynamically adjusted, for example, using data relating to the first insertion rate estimate. According to one embodiment where the access network corresponds to a cable network, the head end of the cable network may be operable to sign on at least 40,000 cable modems within a time interval of not more than 300 seconds.

15 Claims, 13 Drawing Sheets

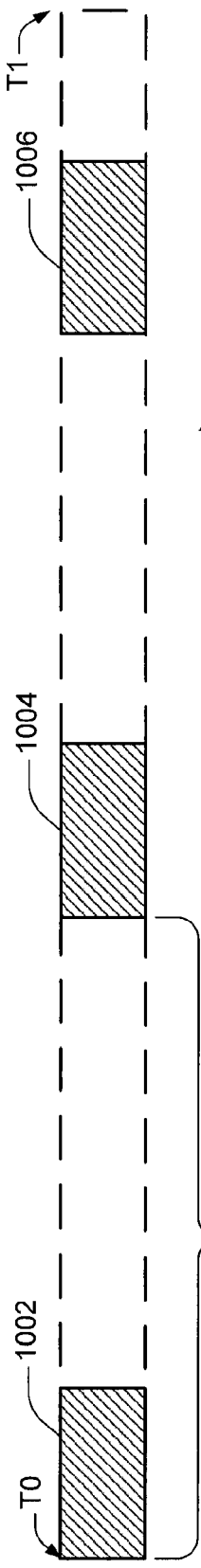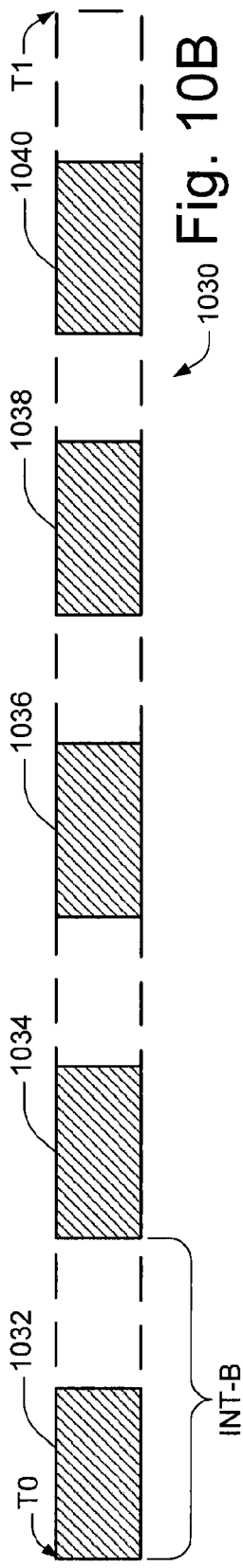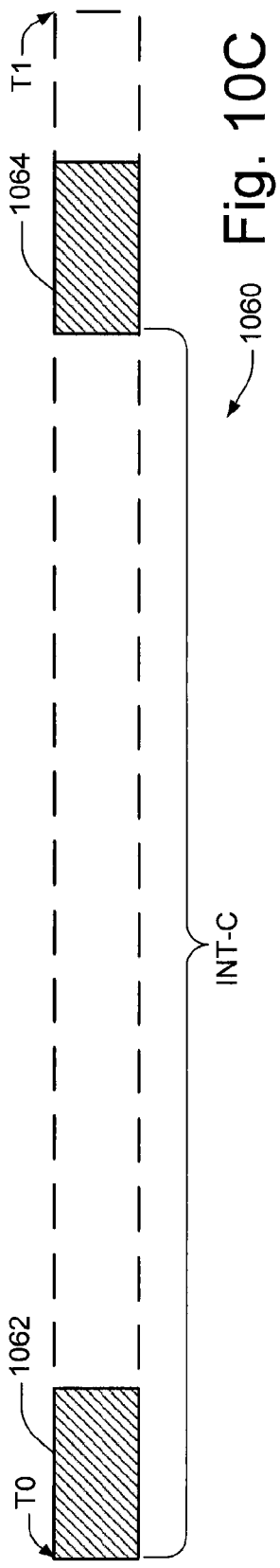

NODE REGISTRATION TECHNIQUE IMPLEMENTED IN ACCESS NETWORKS

BACKGROUND

1. Technical Field

The present disclosure relates generally to computer network technology.

2. Description of the Related Art

Broadband access technologies such as, for example, cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

BRIEF DESCRIPTION OF THE DRAWINGS

FIG. 10A shows an example IM sub-channel 1000 in accordance with a specific embodiment.

FIG. 10B shows an example IM sub-channel 1030 in accordance with a specific embodiment.

FIG. 10C shows an example IM sub-channel 1060 in accordance with a specific embodiment.

DESCRIPTION OF EXAMPLE EMBODIMENTS

In the following description, numerous specific details are set forth in order to provide a thorough understanding of the disclosed embodiments. It will be understood, however, that alternatives of the disclosed embodiments may be practiced without some or all of these specific details. In other instances, well-known process steps have not been described in detail in order not to unnecessarily obscure the disclosed embodiments.

Overview

Various embodiments described herein disclose methods, systems, and/or computer program products for facilitating communication between nodes and a head end of an access network. In at least one embodiment the access network includes a head end, at least one shared access upstream channel and at least one downstream channel. A first insertion rate estimate may be determined. In at least one embodiment, the first insertion rate estimate may relate to an estimated number of nodes attempting to sign-on to the access network during one or more time interval(s). In at least one embodiment, a frequency of occurrence of initial maintenance opportunities available to a first plurality of network nodes may be dynamically adjusted, for example, using data relating to the first insertion rate estimate. According to one embodiment where the access network corresponds to a cable network, the head end of the cable network may be operable to complete sign-on of at least 40,000 cable modems within a time interval of not more than 300 seconds.

Specific Example Embodiments

Figure 6:
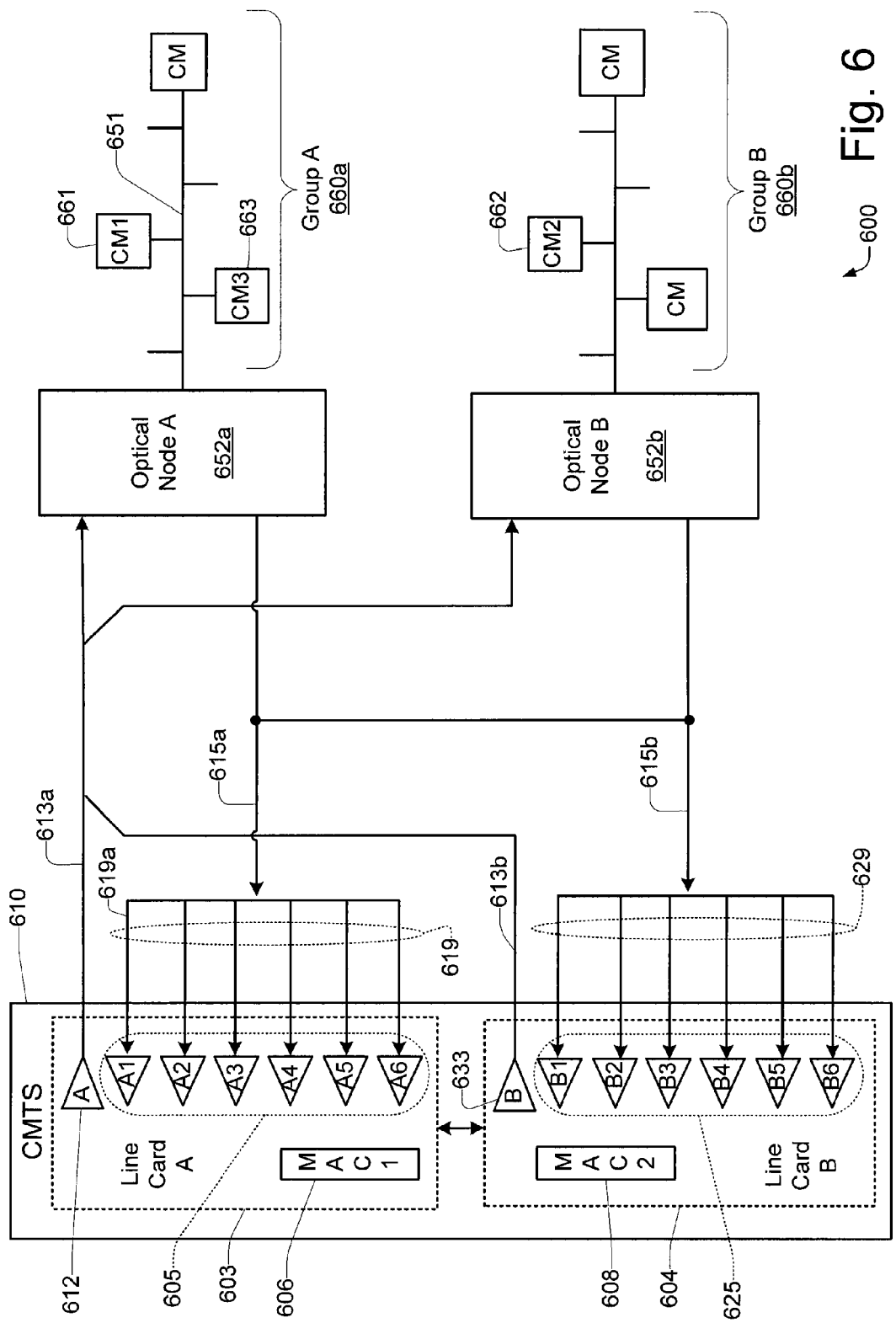
FIG. 6 shows a block diagram of a hybrid-fiber coaxial (HFC) network in accordance with a specific embodiment.
Figure 9:
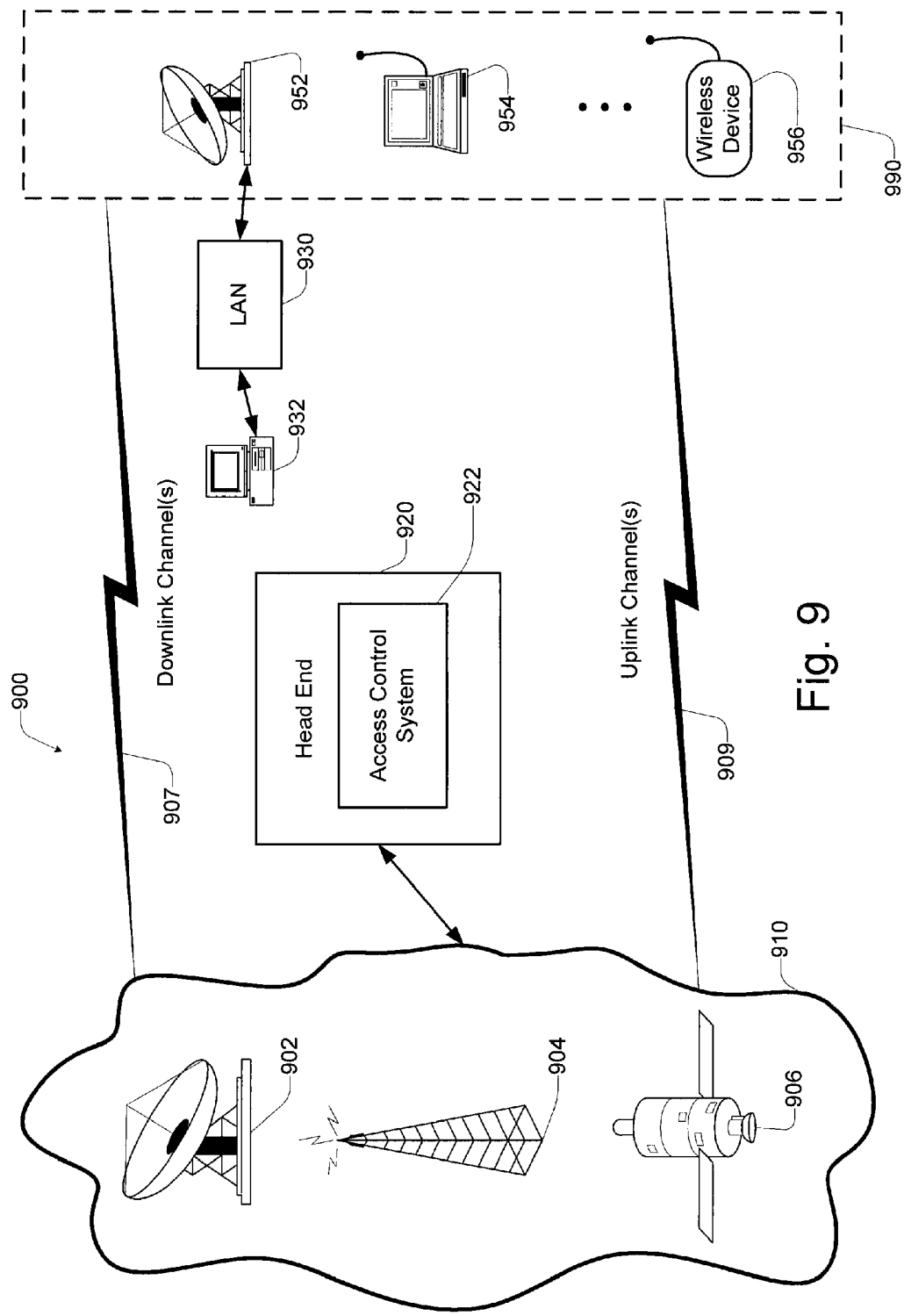
FIG. 9 shows an example of a wireless data communication system 900 in accordance with a specific embodiment.

Various embodiments described herein may be utilized in a variety of access networks, such as, for example, cable or HFC networks, digital video broadcasting (DVB) networks, wireless networks, and/or other types of shared access networks. An example of a wireless network portion is shown in FIG. 9. An example of a cable network portion is shown in FIG. 6. As illustrated in the example of FIG. 6. the cable network portion may include a head end which is configured to provide interactive services and communications with a plurality of network nodes (e.g., cable modems) and/or user terminals. In order to provide interactive network functionality, the head end may include a Cable Modem Termination System (CMTS), such as, for example, the CMTS 610 illustrated in FIG. 6. A head end may include a plurality of physically distinct line cards, such as, for example, Line Card A 603 and Line Card B 604. Each line card may connect to one or more optical nodes, such as, for example, Optical Node A 652a and Optical Node B 652b. These optical nodes may communicate with one or more groups of cable modems (and/or other network nodes) such as, for example, one or more cable modems in Group A 660a and/or Group B 660b.

It will be appreciated that other types of shared access networks may include other types of hardware and/or software configurations for enabling communication between the head end and plurality of network nodes. However, for purposes of illustration, many of the example embodiments described herein are described with reference to a cable network which includes a CMTS (e.g., head end) and a plurality of cable modems (CMs, e.g., network nodes). However, the example embodiments described herein are not to be limited to use in cable networks, but rather may be utilized and/or adapted for use with any type of shared access network.

In at least one embodiment, several types of access modes may be used in a cable network to allow CMs to communicate with the CMTS via a shared access upstream channel. One access mode is based on contention access, which lets users send information upstream during designated contention-based timeslots. During these contention-based timeslots, there is a risk that one or more collisions may occur with other users' transmissions. Cable modem sign-on operations may be performed using contention-based timeslots (commonly referred to as Initial Maintenance (IM) slots or Ranging slots). Other modes of access on the upstream channel are non-contention based, such as, for example, data grant timeslots, which are timeslots specifically allocated or reserved for use only by designated cable modems. These different types of access modes may be dynamically shared among the various timeslots available on a given upstream channel, which allows CMs to know when contention based transmission is or is not allowed. This may also help to avoid collisions for the non-contention based access modes.

In specific embodiments, the shared access network may be adapted to utilize a standardized communication protocol for enabling communication between the head end and network nodes. For example, in at least one embodiment, the shared access network may be operable to utilized the well known Data-Over-Cable Service Interface Specifications (DOCSIS) protocol such as for example, the DOCSIS Radio Frequency Interface Specification CM-SP-RFIv2.0-I11-060602 standard and/or the DOCSIS 3.0 standard (CM-SP-MULPIv3.0405-070803), each of which is available at www.cablelabs.com. In other embodiments, other versions of the DOCSIS Radio Frequency Interface Specification may be used. However, for purposes of illustration, various example embodiments described herein are described using the above-referenced DOCSIS protocol.

For example, in one embodiment, as part of the sign-on procedure described in the DOCSIS standard, a cable modem (CM) may be required to perform a variety of different activities and/or operations, in a particular ordered sequence. Examples of such activities and/or operations may include, but are not limited to, one or more of the following (or combination thereof):

- initial ranging activities;
- periodic ranging activities;
- Dynamic Host Configuration Protocol (DHCP) activities;
- Trivial File Transfer Protocol (TFTP) activities;
- time of day determination activities;
- registration activities;
- etc.

For example, in one embodiment, a cable modem sign-on process may be implemented as multi-stage pipe-line of activities in the following sequence: initial ranging, periodic ranging, DHCP, TFTP, time of day (ToD), and registration.

For example, as part of the DOCSIS sign-on procedure, the CMTS periodically allocates Initial Maintenance (IM) contention-based timeslots on the upstream channels to be used for facilitating cable modems coming online. For example, in one embodiment, a CM desiring to sign-on to the network may transmit a ranging request message to the CMTS during one of the IM timeslots which has been allocated on a given upstream channel. Typically, the IM timeslots are implemented as contention-based timeslots, meaning that collisions may occur if more than one CM transmits a ranging request message (hereinafter "ranging request message") on the same upstream channel during a given IM timeslot. When a collision occurs, the CMTS may be unable to identify and/or decipher the received data transmitted by the CMs, and therefore will be unable to respond to the appropriate CMs which were requesting signing-on. In at least one embodiment, when a ranging request message collisions occur, the affected CMs may be required to wait some time interval before attempting to transmit another ranging request message to the CMTS, thereby further delaying the sign-on process.

However, contrary to conventional wisdom that delays in cable modem sign-on procedures are typically caused by message collisions on shared-access upstream channels, it has been discovered that significant delays in the CM sign-on process may occur at the DHCP and TFTP processing stages of the sign-on process. As a result of the bottleneck(s) at DHCP and/or TFTP stages, the sign-on process for cable modems experiencing such delays may eventually timeout, and re-start. This may further exacerbate the problem by causing excessive restarts of the sign-on pipe-line for multiple CMs.

In at least one embodiment, a high performance CMTS may be operable to support a relatively large number (e.g., 20,000-50,000) of cable modem subscribers. In one embodiment, such CMTS may include a centralized processor, and individual line card processors. The centralized processor may perform modem registration transactions such as TFTP, DHCP, ARP, route adjacency add/delete, which could become a system bottleneck, for example, when multiple tens of thousands of modem try to get online simultaneously (such as, for example, upon the occurrence of a CMTS reload and/or catastrophic recovery). When such a situation occurs, excessive numbers of CMs may be delayed or stuck in the in DHCP and/or TFTP states, and may eventually time-out and drop offline. Moreover, this cycle may repeat itself, thereby further aggravating the situation One possible solution to this problem is to dynamically adjust and/or control (e.g., dynamically throttle up/down) the number of CMs undergoing sign-on operations at desired time intervals (e.g., during predefined time intervals following a CMTS reload and/or a catastrophic recovery) in order to obtain or achieve a desired (e.g., optimum) number of cable modems which are actively undergoing DHCP and/or TFTP activities during such time intervals. In at least one embodiment, such dynamic adjustment and/or control of CMs undergoing sign-on operations may be achieved, for example, by dynamically adjusting (e.g., throttling up/down) availability of initial-ranging opportunities to CMs. According to one embodiment, by throttling the availability of initial-ranging opportunities to CMs, it is possible to coordinate optimal throughput of DHCP/TFTP services, and maintain the optimum sign-on pipe-line operations to get cable modems online.

Accordingly, one aspect described herein is directed to various techniques facilitating CM sign-on processes and/or for reducing delays associated with CM sign-on operations. For example, various techniques described herein may be used to enable a shared access network (e.g., cable network) to sign-on at least 40,000 nodes in less than 300 seconds.

Figure 1:
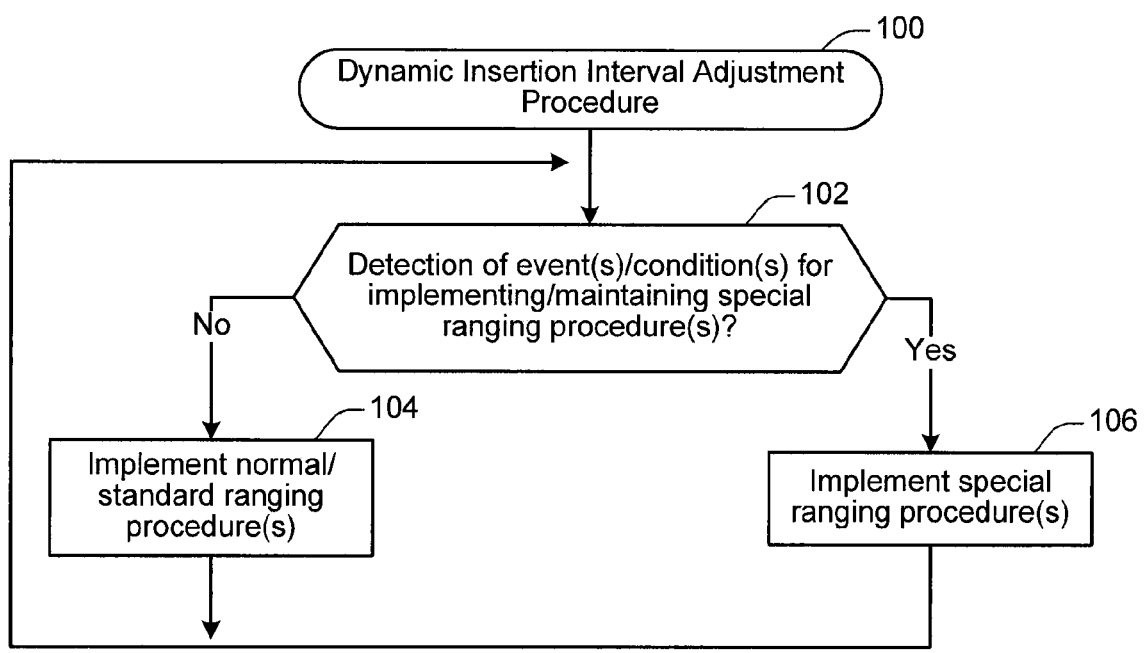
FIG. 1 shows an example of a Dynamic Insertion Interval Adjustment Procedure 100 in accordance with a specific embodiment.

FIG. 1 shows an example of a Dynamic Insertion Interval Adjustment Procedure 100 in accordance with a specific embodiment. In at least one embodiment, at least a portion of the operations performed by the Dynamic Insertion Interval Adjustment Procedure may be implemented at the head end of an access network, such as, for example, the CMTS of a cable network. For example, at least a portion of the operations performed in the example of FIG. 1 may be implemented at the CMTS 610 illustrated in FIG. 6.

In at least one embodiment, more than one instance of the Dynamic Insertion Interval Adjustment Procedure may be run concurrently. In specific embodiments, for example, a separate instance of the Dynamic Insertion Interval Adjustment Procedure may be initiated for different physical and/or logical interfaces, channels, line cards, DOCSIS domains, CMTSs, and/or other network software and/or hardware.

As shown in the example of FIG. 1 at 102, a determination may be made as to whether one or more events and/or conditions have been detected for implementing and/or maintaining special ranging procedures. One embodiment of a special ranging procedure is shown and described, for example, with respect to FIGS. 3 and 4 of the drawings.

According to various embodiments, a variety of different events, conditions, and/or other criteria may be used to trigger implementation and/or continued operation of special ranging procedures which may be specifically configured or designed to facilitate and expedite CM sign-on operations. Examples of such events, conditions, and/or other criteria may include, but are not limited to, one or more of the following and/or combinations thereof:

- crash of a CMTS or head end, switch, and/or other network device;
- a network failure condition, such as, for example, failure of the CMTS or head end, switch, and/or other failure;
- the CMTS or head end, switch, and/or other network device going off line;
- number of CM/nodes attempting to sign-on to the network;
- number of CM/nodes attempting to perform sign-on operations (e.g., during given time interval T) detected as exceeding specified threshold value;
- number of upstream message collisions detected as exceeding specified threshold value;
- number of active CM/nodes detected as being below a minimum threshold value;
- CM/node insertion rate detected as exceeding specified threshold value;
- other conditions/events which may result a significant portion of active/on-line CMs/nodes going off-line.

For purposes of illustration, and in order to avoid confusion, the various conditions, events and/or other criteria described above will be referred to simply as events with respect to the example embodiments described below. However, the triggering mechanism for implementing and/or maintaining special ranging procedures, as well as the triggering mechanisms for initiation of other procedures described herein, should not be limited to events, but rather may include any appropriate conditions, events, other criteria, and/or combinations thereof. Additionally, these events need not be detected directly, but may also be estimated or derived from other sources.

As shown in the example of FIG. 1 at 104, if it is determined that no event/condition has been detected for implementing and/or maintaining special ranging procedures, normal or standard ranging procedures may be implemented. In some embodiments, normal or standard ranging procedures may correspond to ranging procedures which may be desired or preferred during normal network operating conditions and/or during times when no special ranging procedure triggering events have been detected. In one embodiment, "standard" or "normal" ranging procedures may include scheduling or allocating IM timeslots on one or more upstream channels at a first periodic rate or interval. For example, in one embodiment, during normal ranging procedures, the insertion interval of IM timeslots for a given interface may be within the range of 50 ms to 1 second.

According to specific embodiments, desired values for insertion interval may be predetermined and/or automatically determined for different physical and/or logical interfaces, channels, line cards, DOCSIS domains, and/or CMTS chassis.

As shown in the example of FIG. 1 at 106, if at least one event/condition has been detected for implementing and/or maintaining special ranging procedures, then at least one action may be performed for initiating and/or maintaining special ranging procedures. In some embodiments, it may be that special ranging procedures are already in effect, and therefore will be continued. In some embodiments, at least one action that may be performed for repeating and/or maintaining a special ranging procedure or procedures already in effect. In other embodiments, at least one action that may be performed for initiating or implementing special ranging procedures not already in effect.

In at least one embodiment, implementation of at lease one special ranging procedure may include automatically and/or dynamically modifying or adjusting an IM message insertion interval for one or more physical and/or logical interfaces, channels, line cards, DOCSIS domains, and/or CMTS chassis. In at least one embodiment, the term "insertion interval" may be used to represent a time interval between IM timeslot allocations for a given physical and/or logical interface, channel, line cards, DOCSIS domain, and/or CMTS chassis. Examples of different IM insertion intervals are illustrated, for example, in FIGS. 10A-C of the drawings. According to different embodiments, the insertion interval values may be measured in different units of time and/or frequency such as, for example, seconds, milliseconds, microseconds, slots/second, slots/millisecond, etc. In various embodiments, the insertion interval may represent a value in accordance with a particular network device and/or an average and/or combined value for different physical and/or logical interfaces, channels, line cards, DOCSIS domains, and/or CMTS chassis.

As explained in greater detail below, dynamic adjustment of the insertion rate (e.g., for a given interface or group of interfaces at the CMTS) may result in dynamic adjustment of the node (e.g., CM) insertion rate (e.g., for the given interface or group of interfaces). In different embodiments, the term "insertion rate" may be used to represent the rate at which new nodes are being inserted into (or logged onto) the access network. For example, in one embodiment relating to cable networks, the term "insertion rate" may be used to represent the rate at which cable modems are being "inserted" into the network, which, for example, may be measured or determined by analyzing information relating to various CM sign-on activities during one or more time intervals. For example, in one embodiment, the term "insertion rate" may be used to represent the rate at which CM ranging requests are received or detected (e.g., for one or more physical and/or logical interfaces, channels, line cards, DOCSIS domains, and/or CMTS chassis).

In at least one embodiment, the CMTS may be operable to support a relatively large number of cable modem subscribers, such as, for example 20,000-50,000 subscribers. In one embodiment, such a CMTS may include a centralized processor, and individual line card processors. In one embodiment, the centralized processor may be operable to perform cable modem registration transactions such as, for example, TFTP, DHCP, ARP, route adjacency add/delete. However, such transactions may become a system bottleneck, for example, in situations where multiple tens of thousands of CMs are simultaneously attempting to get online. Examples of such situations may include, for example, CMTS reloads, catastrophic network recovery, etc. When such situations occur, excessive numbers of cable modems may be stuck in DHCP or TFTP states, and such CMs may eventually time out and drop offline. As the cycle continues, the situation may be further aggravated.

One proposed solution in such situations is to throttle or control availability initial-ranging opportunities (such as those made available via IM timeslots (and/or other node sign-on opportunities) in order to allow for a desired, optimum number of cable modems to undergo network sign-on activities during one or more given time periods.

In at least one embodiment, the CMTS may include a packet routing engine ("PRE") operable to process ranging request messages and/or other communications from the network nodes. In one embodiment, a master process may run on the PRE which is operable to receive periodic statistic information from each (or selected) line card(s) at the CMTS. The statistic data which each line card may report to the PRE may include, for example, current ranging rate(s) for each (or selected) DOCSIS MAC Domain(s) associated with that line card. In one embodiment, the current initial ranging success rate may be used to determine a gross estimation of the incoming cable modem insertion rate(s). In one embodiment, each cable modem may be operable to perform MAC management protocol transactions in order to come online or sign-on to the network. In at least one embodiment, the CMTS may be operable to analyze information relating to all incoming CM insertion rates for all (or selected) line card(s) and determine (e.g., in real-time or substantially real-time) an estimated "global" CMTS insertion rate.

In one embodiment, after the CMTS has computed the estimated insertion rate (e.g., on the fly) at least a portion of the following logic may be applied: (1) if that rate is faster than an optimal rate (e.g., based, for example, on the CMTS architecture and/or number of CMs attempting to sign-on), the CMTS may take appropriate action to throttle down the current insertion rate; and/or (2) if the insertion rate is slower than the optimal rate, the CMTS may take appropriate action to throttle up the current insertion rate. In at least one embodiment, each MAC Domain may be individually throttled by this process.

In at least one embodiment, the "optimal" insertion rate for a given CMTS (and/or other head end system) may be based on a variety of different criteria such as, for example, one or more of the following (or combinations thereof):
  CMTS architecture;
  CMTS performance capabilities;
  PRE performance capabilities;
  number of nodes (e.g., cable modems) supported by the CMTS;
  network conditions;
  CMTS and/or PRE performance history;
  etc.

For example, in one embodiment, the "optimal" insertion rate for a given CMTS may be determined based upon laboratory tests and/or other tests and/or simulations. According to specific embodiments, the optimal insertion rate for a given vendor's CMTS may be determined and/or specified by the vendor.

In at least one embodiment, one or more new counters may be added to the CMTS code, for example, to track number of ranging requests and/or number of modems online on the CMTS. In at least one embodiment, one or more of the counters may be incremented appropriately in the modem bring-up state machine of the CMTS code. The data from one or more counters may be read at periodic intervals (e.g., every 10 seconds, every 0.5-30 seconds), for example, for use in determining the estimated insertion rate and/or other information.

Figure 2B:
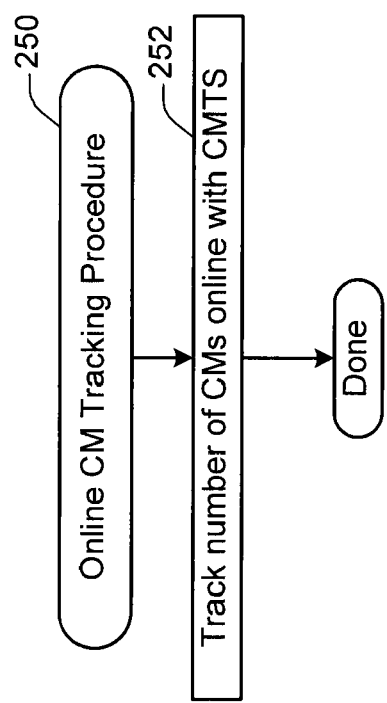
FIG. 2B shows an example of an Online CM Tracking Procedure 250 in accordance with a specific embodiment.
Figure 2A:
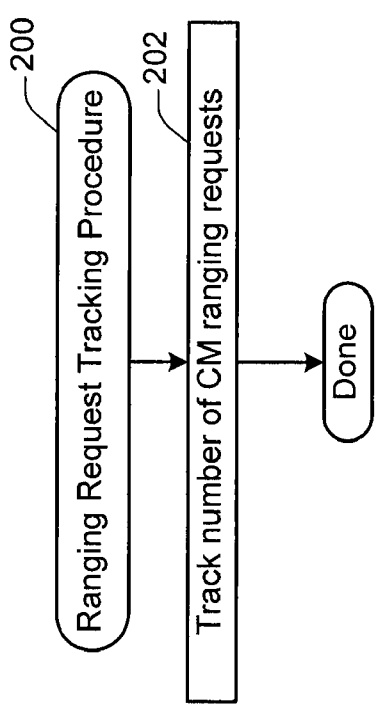
FIG. 2A shows an example of a Ranging Request Tracking Procedure 200 in accordance with a specific embodiment.

FIG. 2A shows an example of a Ranging Request Tracking Procedure 200 in accordance with a specific embodiment. In at least one embodiment, at least a portion of the functionality relating to the Ranging Request Tracking Procedure may be implemented at the CMTS via a counter, such as, for example, a software counter, a hardware counter, and/or some combination thereof.

As shown in the example of FIG. 2A at 202, the Ranging Request Tracking Procedure may be configured to record and/or track a number of CM ranging requests (e.g., for one or more physical and/or logical interfaces, channels, line cards, DOCSIS domains, and/or CMTS chassis). In at least one embodiment, a ranging request may be transmitted by a CM to the CMTS during an allocated IM timeslot on an upstream channel. In specific embodiments, CM ranging request may be used by a CM to perform network login/sign-on procedures which, for example, may include, but are not limited to, one or more of the following (or combination thereof): initial ranging activities; periodic ranging activities; Dynamic Host Configuration Protocol (DHCP) activities; Trivial File Transfer Protocol (TFTP) activities; time of day determination activities; CMTS registration activities; etc.

In at least one embodiment, more than one instance of the Ranging Request Tracking Procedure may be run concurrently. In specific embodiments, for example, separate instances of the Ranging Request Tracking Procedure may be initiated (e.g., concurrently, consecutively, and/or some combination thereof) in order to track the number of CM ranging requests over multiple time intervals. In another embodiment, for example, separate instances of the Ranging Request Tracking Procedure may be initiated (e.g., concurrently, consecutively, and/or some combination thereof) in order to track the number of CM ranging requests for different physical and/or logical interfaces, channels, line cards, DOCSIS domains, and/or CMTS chassis.

In particular embodiments, the number of CM ranging requests may be used to automatically and/or dynamically determine or calculate a preferred initial maintenance (IM) insertion interval value for one or more physical and/or logical interfaces, channels, line cards, DOCSIS domains, and/or CMTS chassis. In some embodiments, the number of CM ranging requests may be used for other purposes, such as, for example, determining adjustments of different criteria and/or parameters relating to network performance and/or cable modem sign-on procedures.

One embodiment of the Ranging Request Tracking Procedure may record and/or track the number of ranging requests during a specific time interval or intervals, such as, for example, the entire time that the CMTS is online, and/or one or more particular time intervals, which, for example, may be defined individually, periodically, and/or through other means. For example, in at least one embodiment the Ranging Request Tracking Procedure may record the number of CM ranging requests received and/or detected at specific times such as, for example, at times T0 and T1. In other embodiments, the Ranging Request Tracking Procedure may record the number of CM ranging requests received and/or detected during specific time intervals such as, for example, the time interval T0-T1, where T0 and T1 represent specific time values. According to specific embodiments, the desired time instances or intervals for which it may be desirable to monitor or track CM ranging requests may be predefined (e.g., via one or more configuration files), may be dynamically determined (e.g., at periodic intervals), may be specified by a user, and/or may be determined and/or calculated via other mechanism and/or some combination thereof.

FIG. 2B shows an example of an Online CM Tracking Procedure 250 in accordance with a specific embodiment. In at least one embodiment, at least a portion of the functionality relating to the Online CM Tracking Procedure 250 may be implemented at the CMTS via a counter, such as, for example, a software counter, a hardware counter, and/or some combination thereof.

As shown in the example of FIG. 2B at 252, the Online CM Tracking Procedure may be configured to record and/or track the number of CMs which are signed-on or online (which, for example, may include being registered as active at the CMTS) during one or more specified time instances and/or time intervals. In specific embodiments, the number of online CMs may be used in determining and/or calculating various parameters such as, for example: CM insertion rate, IM insertion interval, and/or other parameters described herein.

In one embodiment, the Online CM Tracking Procedure may record and/or track the number of CMs that are online (or came online) during a specific time interval, such as, for example, the entire time that the CMTS has been online, and/or one or more specific time intervals which, for example, may be defined individually, periodically, and/or through other mechanisms. For example, in one embodiment, the Online CM Tracking Procedure may track or record the number of CMs that came online during the time interval T0-T1, where T0 and T1 represent specific time values. According to specific embodiments, such time intervals may be predefined (e.g., via one or more configuration files), may be dynamically determined (e.g., at periodic intervals), may be specified by a user, and/or may be determined and/or calculated via other mechanism and/or some combination thereof. Additionally, in at least some embodiments, the Online CM Tracking Procedure may record and/or track the number of active or online CMs which are associated with different physical and/or logical interfaces, channels, line cards, DOCSIS domains, and/or CMTS chassis.

In at least one embodiment, more than one instance of the Online CM Tracking Procedure may be run concurrently. For example, in specific embodiments, separate instances of the Online CM Tracking Procedure may be run concurrently in order to track the number of online CMs for different time intervals and/or for different time instances. In other embodiments, separate instances of the Online CM Tracking Procedure may be run concurrently in order to track the number of online or active CMs which are associated with different physical and/or logical interfaces, channels, line cards, DOCSIS domains, and/or CMTS chassis.

Figure 3:
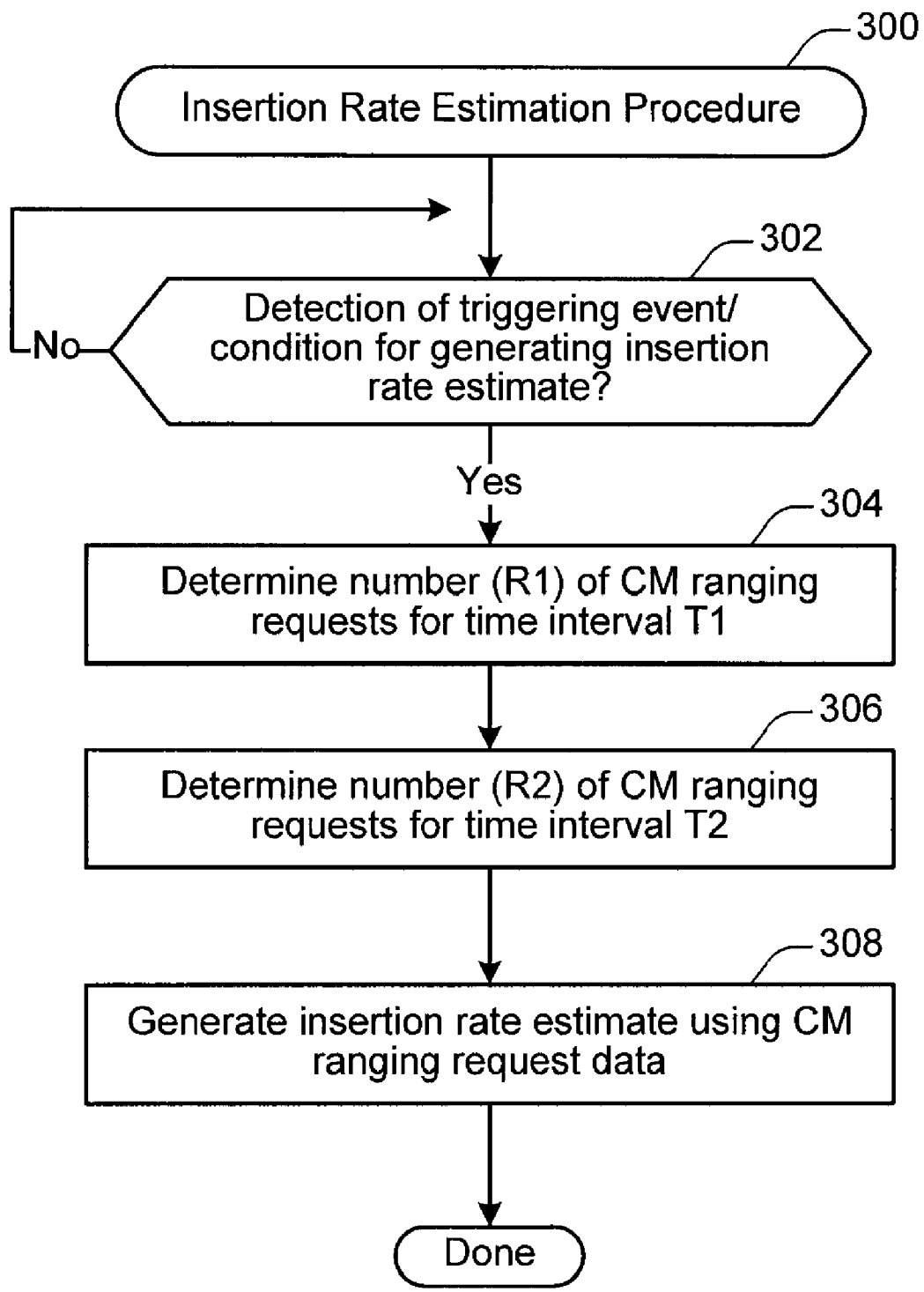
FIG. 3 shows an example of an Insertion Rate Estimation Procedure 300 in accordance with a specific embodiment.

FIG. 3 shows an example of an Insertion Rate Estimation Procedure 300 in accordance with a specific embodiment. In at least one embodiment, at least a portion of the functionality relating to the Insertion Rate Estimation Procedure may be implemented at a head end or CMTS, such as, for example, CMTS 610 illustrated in FIG. 6. In at least one embodiment, separate instances of the Insertion Rate Estimation Procedure may be initiated (e.g., concurrently and/or consecutively) for different physical and/or logical interfaces, channels, line cards, DOCSIS domains, and/or CMTS chassis.

As mentioned previously, in at least one embodiment, the term "insertion rate" may be used to represent the rate at which cable modems are attempting to sign-on to the network. In other embodiments, the term "insertion rate" may be used to represent the rate at which CM ranging requests are received or detected (e.g., for one or more physical and/or logical interfaces, channels, line cards, DOCSIS domains, and/or CMTS chassis) at the CMTS. In particular embodiments, the insertion rate may be measured and/or expressed in terms of CMs per second, seconds per CM, CMs per millisecond, milliseconds per CM, and/or other types of units generally known to one having ordinary skill in the art.

In at least one embodiment, separate instances of the Insertion Rate Estimation Procedure may be initiated (e.g., concurrently, consecutively, and/or some combination thereof) for different physical and/or logical interfaces, channels, line cards, DOCSIS domains, and/or CMTS chassis. In specific embodiments, the Insertion Rate Estimation Procedure may be initiated or implemented at specified intervals, such as, for example: at fixed time intervals; at periodic intervals (e.g., about every 10 seconds, about every 1-60 seconds, etc.); upon detection of certain triggering events and/or conditions; etc.

As shown in the example of FIG. 3 at 302, a determination may be made as to whether one or more events and/or conditions have been detected for calculating or generating an insertion rate estimate. For example, the detection of one or more events and/or conditions as discussed above in relation to the example of FIG. 1 at 106 may trigger the calculation or generation of an insertion rate estimate. Examples of other triggering conditions and/or events may include, but are not limited to, one or more of the following (or combinations thereof): timer expiration, implementation of special ranging procedure(s), and/or other events and/or conditions such as those described herein.

As shown in the example of FIG. 3, a first number of ranging requests (R1) received at the CMTS or head end at a first time (T1) may be determined (304), and a second number of ranging requests (R2) received at the CMTS or head end at a second time (T2) may be determined (306). In one embodiment, the values R1 and R2 represent a cumulative total number of ranging requests received at the CMTS at times T1 and T2, respectively. According to different embodiments, the values for R1 and R2 may be determined at specified time periods such as, for example: upon demand; at fixed time intervals, at periodic intervals (e.g., about every 2 seconds, about every 0.5-5 seconds, etc.); upon detection of certain triggering events and/or conditions; etc. In a specific embodiment, time interval T2-T1 may, for example, correspond to a time a period of about 2 seconds. In other embodiments, time intervals represented by T2-T1 may be selected from a range of time values such as, for example, 0.5-5 seconds. In particular embodiments, the values of T1, T2, and/or interval T2-T1 may be predefined (e.g., via one or more configuration files), may be dynamically determined, may be specified by a user, and/or may be determined and/or calculated via other mechanism and/or some combination thereof.

As shown in the example of FIG. 3 at 308, an insertion rate estimate may be generated. In one embodiment, the insertion rate estimate may be generated a using at least a portion of the ranging request data determined at 304 and/or 306. In at least one embodiment, the insertion rate estimate may be calculated in accordance with a number of CM ranging requests (e.g., R2−R1) received over a particular time interval (e.g., T2−T1). For example, in some embodiments the insertion rate estimate may be calculated according to the following formula:

$$\text{Insertion\_Rate\_Estimate} = \frac{R_2 - R_1}{T_2 - T_1} \tag{1}$$

According to different embodiments, the insertion rate estimate may be calculated at specified times, such as, for example: at fixed time intervals; at periodic intervals (e.g., about every 10 seconds, about every 0.5-30 seconds, etc.); upon detection of certain triggering events and/or conditions; etc. In one embodiment, the insertion rate estimate may be periodically generated or calculated at a frequency sufficient to allow at least 40,000 cable modems to sign-on to the network during a time interval of 300 seconds or less.

In different embodiments, the number of ranging requests received in the time interval between T1 and T2 may be counted directly. For example, in one embodiment, the estimated insertion rate may be determined using equation (1) above where $R_2-R_1$ equals the number of insertion requests received between $T_1$ and $T_2$. In other embodiments, other equations and/or formulas may be used to determine the estimated insertion rate. Additionally, in at least some embodiments, the estimated insertion rate may be determined by using other techniques, such as, for example, looking up values in a table and/or file.

In at least one embodiment, the insertion rate estimate may be manipulated and/or adjusted in accordance with a desired numeric format. For example, according to different embodiments, the insertion rate estimate value may be rounded to the nearest whole integer, may be rounded to a specified number of decimal places, may be normalized to conform with a desired range of values, etc. In one embodiment, the insertion rate estimate may be manipulated according to the formula:

$$\text{Insertion\_Rate\_Est}' = (\text{Insertion Rate Est.} + 50)/100 \quad (2),$$

where the variable Insertion_Rate_Est. is calculated using equation (1) above. In at least one embodiment, the modified Insertion_Rate_Estimate' represents a normalized insertion rate estimate which, for example, may be used to perform a table lookup.

In at least one embodiment, it is preferable that the algorithm and/or other mechanisms used for computing or determining the insertion rate estimate be operable to allow the desired insertion rate estimate value(s) to be determined within a specified time interval. For example, in one embodiment, it is preferable that the mechanism used for computing or determining the insertion rate estimate be operable to allow one or more insertion rate estimate value(s) to be calculated or generated every 10 seconds, or, for example, within a range of every 0.5-30 seconds.

Figure 4A:
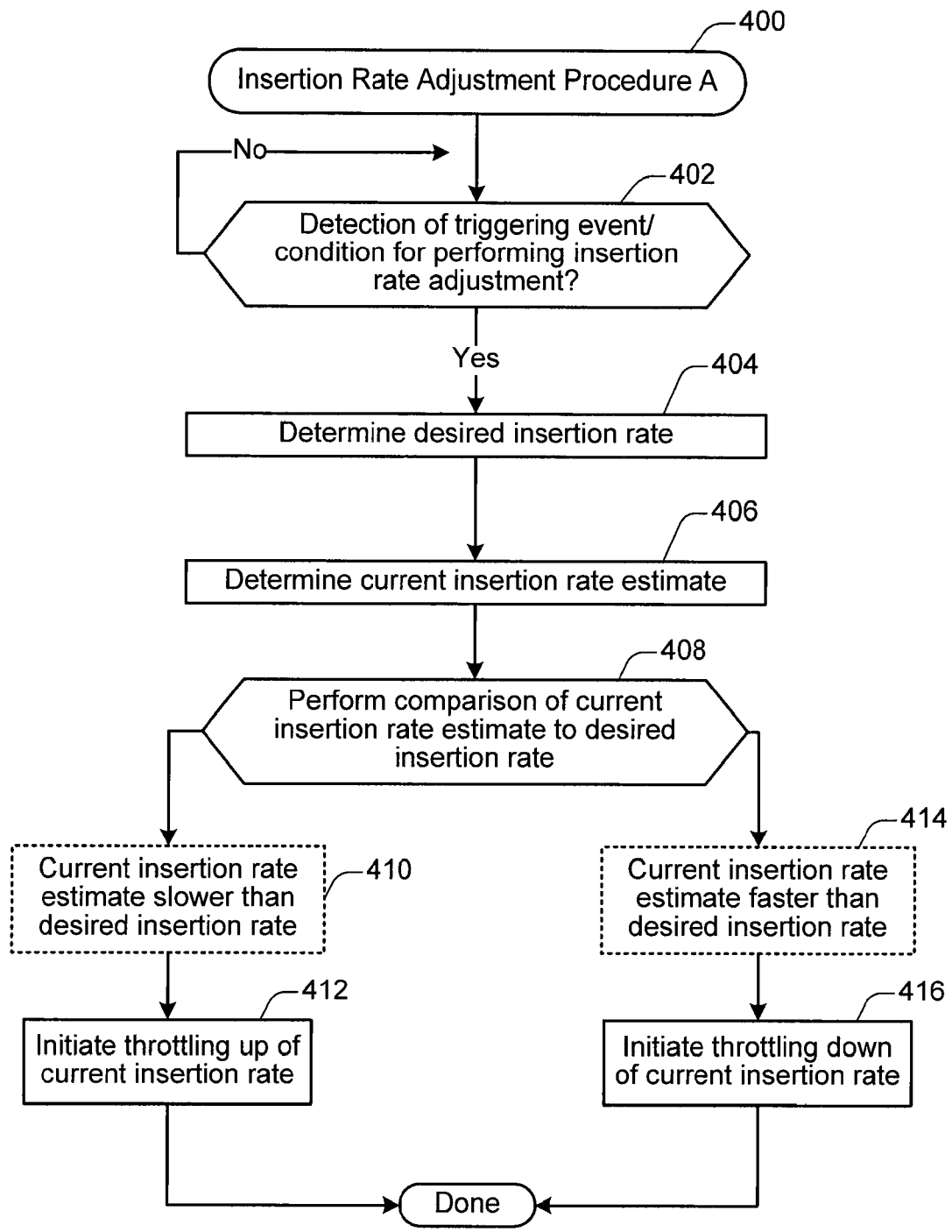
FIG. 4A shows an example of an Insertion Rate Adjustment Procedure 400 in accordance with a specific embodiment.

FIG. 4A shows an example of an Insertion Rate Adjustment Procedure 400 in accordance with a specific embodiment. In at least one embodiment, at least a portion of the functionality relating to the procedure may be implemented at the CMTS or head end of an access network. In at least one embodiment, separate instances of the Insertion Rate Adjustment Procedure may be initiated (e.g., concurrently and/or consecutively) for different physical and/or logical interfaces, channels, line cards, DOCSIS domains, and/or CMTS chassis.

According to different embodiments, the Insertion Rate Adjustment Procedure may be implemented at specified times, such as, for example: at fixed time intervals; at periodic intervals (e.g., about every 10 seconds, about every 0.5-30 seconds, etc.); upon detection of certain triggering events and/or conditions; etc. In one embodiment, the Insertion Rate Adjustment Procedure may be periodically initiated or implemented a frequency sufficient to allow a desired number of cable modems (e.g., at least 40,000 cable modems) to sign on to the network during a given time interval (e.g., in 300 seconds or less).

As shown in the example of FIG. 4A at 402, a determination may be made as to whether one or more events and/or conditions have been detected for performing an insertion rate adjustment (e.g., for one or more different physical and/or logical interfaces, channels, line cards, DOCSIS domains, and/or CMTS chassis). For example, the detection of one or more events and/or conditions as discussed above in relation to the example of FIG. 1 at 106 may trigger the calculation or generation of an insertion rate estimate. Examples of other triggering conditions and/or events may include, but are not limited to, one or more of the following (or combinations thereof): timer expiration, implementation of special ranging procedure(s), and/or other events and/or conditions such as those described herein.

In at least one embodiment, it is preferable that the algorithm and/or other mechanisms used for adjusting the CM (or node) insertion rate be operable to allow adjustment of one or more insertion rates to be performed within a specified time interval. For example, in one embodiment, it is preferable that the mechanism used for adjusting the CM (or node) insertion rate be operable to allow adjustment of one or more insertion rates (e.g., for different physical and/or logical interfaces, channels, line cards, DOCSIS domains, and/or CMTS chassis) about every 10 seconds, or, for example, within a range of every 0.5-30 seconds.

In the example of FIG. 4A, it is assumed that at least one event and/or condition has been detected for performing an insertion rate adjustment. In one embodiment, as shown, for example, at 404, a desired insertion rate value may be determined. According to different embodiments, one or more desired insertion rate value(s) or ranges of values may be determined for one or more different physical and/or logical interfaces, channels, line cards, DOCSIS domains, and/or CMTS chassis. In other embodiments, this operation may be omitted, if desired. In yet other embodiments, a desired insertion rate value may be implicit in or factored into insertion interval data (see, e.g., FIGS. 5A-C) which may be used to dynamically adjust one or more insertion intervals associated with one or more different physical and/or logical interfaces, channels, line cards, DOCSIS domains, and/or CMTS chassis.

In at least one embodiment, a desired insertion rate may correspond to an optimal insertion rate (e.g., for a given physical and/or logical interface, channel, line card, DOCSIS domain, CMTS chassis, etc). For purposes of illustration, it will be assumed in the present example of FIG. 3 that a desired insertion rate value may be determined for the CMTS as a whole.

In at least one embodiment, the "optimal" insertion rate for a given CMTS (and/or other head end system) may be based on a variety of different criteria such as, for example, one or more of the following (or combinations thereof):

CMTS architecture;
CMTS performance capabilities;
PRE performance capabilities;
number of nodes (e.g., cable modems) supported by the CMTS;
network conditions;
CMTS and/or PRE performance history;
network architecture;
etc.

For example, in one embodiment, the "optimal" insertion rate for a given CMTS may be determined based upon laboratory tests and/or other tests and/or simulations. According to specific embodiments, the optimal insertion rate for a given vendor's CMTS may be determined and/or specified by the vendor.

For example, in one embodiment where the CMTS is implemented using a Cisco a PRE-1 type packet routing engine, the CMTS may have an associated optimal insertion rate of 180 modems/second. In another embodiment where the CMTS is implemented using a Cisco a PRE-2 type packet routing engine, the CMTS may have an associated optimal insertion rate of 377 modems/second.

In various embodiments, the desired insertion rate may be a predetermined value, may be automatically and/or dynamically determined (e.g., in real-time), may be implicit in information stored in one or more data structures, may be implicit related or associated insertion interval values, and/or may be determined via other mechanisms described herein.

As shown in the example of FIG. 4A at 406, an estimate of the current insertion rate may be determined. In at least one embodiment, an estimate of the current insertion rate may be determined (e.g., in real-time), for example, by implementing the Insertion Rate Estimation Procedure of FIG. 3. In other embodiments, an estimate of the current insertion rate may be determined by other mechanisms described herein.

As shown in the example of FIG. 4A at 408, a comparison may be made between the current insertion rate estimate and the desired insertion rate. In at least one embodiment, the results of the comparison at 408 may be used to automatically and/or dynamically adjust the current and/or future insertion rate(s) (and/or the current and/or future insertion intervals) for one or more physical and/or logical interfaces, channels, line cards, DOCSIS domains, and/or CMTS chassis.

For example, in particular embodiments, if it is determined (410) that the current insertion rate estimate is slower (e.g., a lower value) than the desired insertion rate, the current insertion rate may be automatically and dynamically throttled up (e.g., increased) (412). In at least one embodiment, the current insertion rate (e.g., for a given CMTS) may be throttled up by reducing or decreasing the IM insertion interval by a specified amount in order to effectively increase the number of initial ranging opportunities for CMs during a given time period.

In specific embodiments, if it is determined (414) that the current insertion rate estimate is faster (e.g., a higher value) than the desired insertion rate, the current insertion rate may be throttled down, as is shown at 416. In some embodiments, the current insertion rate may be automatically and dynamically throttled down (e.g., decreased) (416). In at least one embodiment, the current insertion rate (e.g., for a given CMTS) may be throttled down by increasing the IM insertion interval by a specified amount in order to effectively decrease the number of initial ranging opportunities for CMs during a given time period.

Figure 4B:
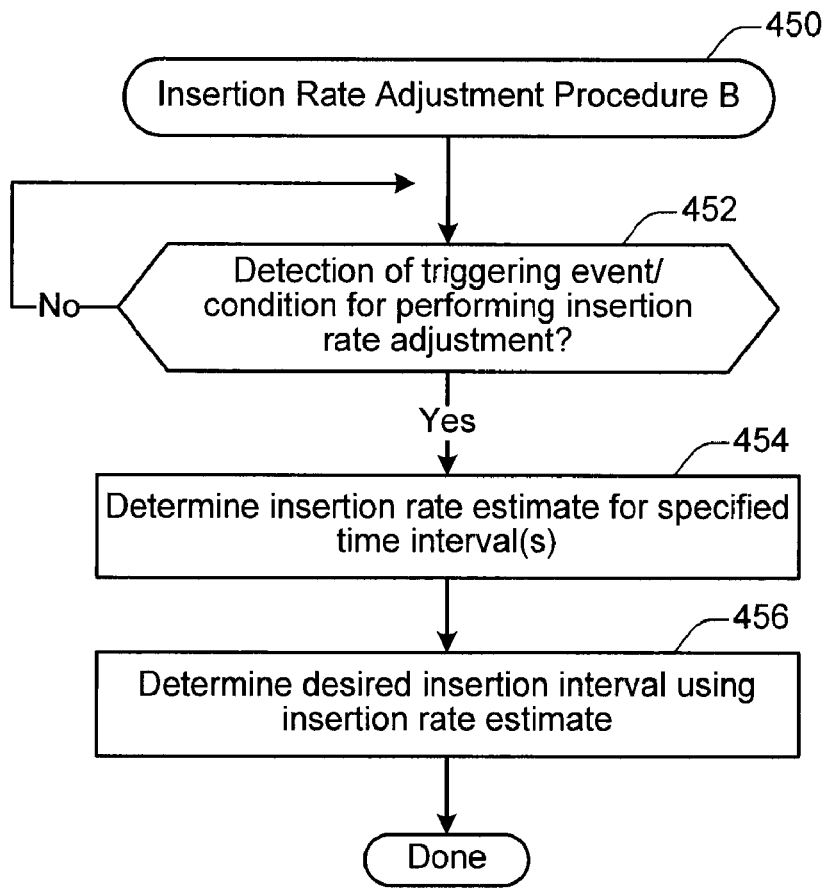
FIG. 4B shows an example of an Insertion Rate Adjustment Procedure B 450 in accordance with a specific embodiment.

FIG. 4B shows an example of an Insertion Rate Adjustment Procedure B 450 in accordance with a specific embodiment. In at least one embodiment, at least a portion of the functionality relating to the procedure may be implemented at the CMTS or head end of an access network. In at least one embodiment, separate instances of the Insertion Rate Adjustment Procedure B may be initiated (e.g., concurrently and/or consecutively) for different physical and/or logical interfaces, channels, line cards, DOCSIS domains, and/or CMTS chassis.

According to different embodiments, the Insertion Rate Adjustment Procedure B may be implemented at specified times, such as, for example: at fixed time intervals; at periodic intervals (e.g., about every 10 seconds, about every 0.5-30 seconds, etc.); upon detection of certain triggering events and/or conditions; etc. In one embodiment, the Insertion Rate Adjustment Procedure B may be periodically initiated or implemented a frequency sufficient to allow a desired number of cable modems (e.g., at least 40,000 cable modems) to sign-on to the network during a given time interval (e.g., in 300 seconds or less).

As shown in the example of FIG. 4B at 452, a determination may be made as to whether one or more events and/or conditions have been detected for performing an insertion rate adjustment (e.g., for one or more different physical and/or logical interfaces, channels, line cards, DOCSIS domains, and/or CMTS chassis). For example, the detection of one or more events and/or conditions as discussed above in relation to the example of FIG. 1 at 106 may trigger the calculation or generation of an insertion rate estimate. Examples of other triggering conditions and/or events may include, but are not limited to, one or more of the following (or combinations thereof): timer expiration, implementation of special ranging procedure(s), and/or other events and/or conditions such as those described herein.

In at least one embodiment, it is preferable that the algorithm and/or other mechanisms used for adjusting the CM (or node) insertion rate be operable to allow adjustment of one or more insertion rates to be performed within a specified time interval. For example, in one embodiment, it is preferable that the mechanism used for adjusting the CM (or node) insertion rate be operable to allow adjustment of one or more insertion rates (e.g., for different physical and/or logical interfaces, channels, line cards, DOCSIS domains, and/or CMTS chassis) about every 10 seconds, or, for example, within a range of every 0.5-30 seconds.

As shown in the example of FIG. 4B at 454, an insertion rate estimate may be determined for one or more specified time intervals. For example, in one embodiment, an insertion rate estimate may be determined for a current (or substantially recent) 2 second time interval to thereby provide an insertion rate estimate based on current operating conditions. In other embodiments, one or more insertion rate estimate(s) may be determined for different time intervals ranging, for example, from 0.5-30 seconds. In at least one embodiment, an estimate of the current insertion rate may be determined (e.g., in real-time), for example, by implementing the Insertion Rate Estimation Procedure of FIG. 3. In other embodiments, an estimate of the current insertion rate may be determined by other mechanisms described herein.

As shown in the example of FIG. 4B at 456, a desired insertion interval value (e.g., for one or more different physical and/or logical interfaces, channels, line cards, DOCSIS domains, and/or CMTS chassis) may be determined using the insertion rate estimate.

In at least one embodiment, a desired insertion interval may correspond to an optimal insertion interval (e.g., for a given physical and/or logical interface, channel, line card, DOCSIS domain, CMTS chassis, etc). For purposes of illustration, it will be assumed in the present example of FIG. 4B that a desired insertion interval value may be determined for a group of interfaces corresponding to a given DOCSIS domain.

In at least one embodiment, the "optimal" insertion interval for a given DOCSIS domain (and/or other interfaces, channels, line cards, etc.) may be based on a variety of different criteria such as, for example, one or more of the following (or combinations thereof):

CMTS architecture;
CMTS performance capabilities;
PRE performance capabilities;
number of nodes (e.g., cable modems) supported by the CMTS;
network conditions;
CMTS and/or PRE performance history;
network architecture;
number of upstream channels (or upstream interfaces);
CM distributions;
etc.

For example, in one embodiment, the "optimal" insertion interval for a given DOCSIS domain may be determined based upon laboratory tests and/or other tests and/or simulations. According to specific embodiments, the optimal insertion interval for a given vendor's CMTS configuration may be determined and/or specified by the vendor.

In various embodiments, the desired insertion interval may be a predetermined value, may be automatically and/or dynamically determined (e.g., in real-time), may be implicit in information stored in one or more data structures, may be implicit related or associated insertion interval values, and/or may be determined via other mechanisms described herein.

According to specific embodiments, for example, a desired insertion interval may be determined, for example, via a variety of mechanisms such as, for example, one or more of the following (or combinations thereof): accessing one or more files; performing one or more data structure (e.g., table) looking up operations; performing one or more dynamic calculations (e.g., via use of one or more formulas, equations, and/or algorithms); querying one or more computerized systems, devices and/or components; upstream channel CM utilization; channel resource availability; etc.

Figure 5A:
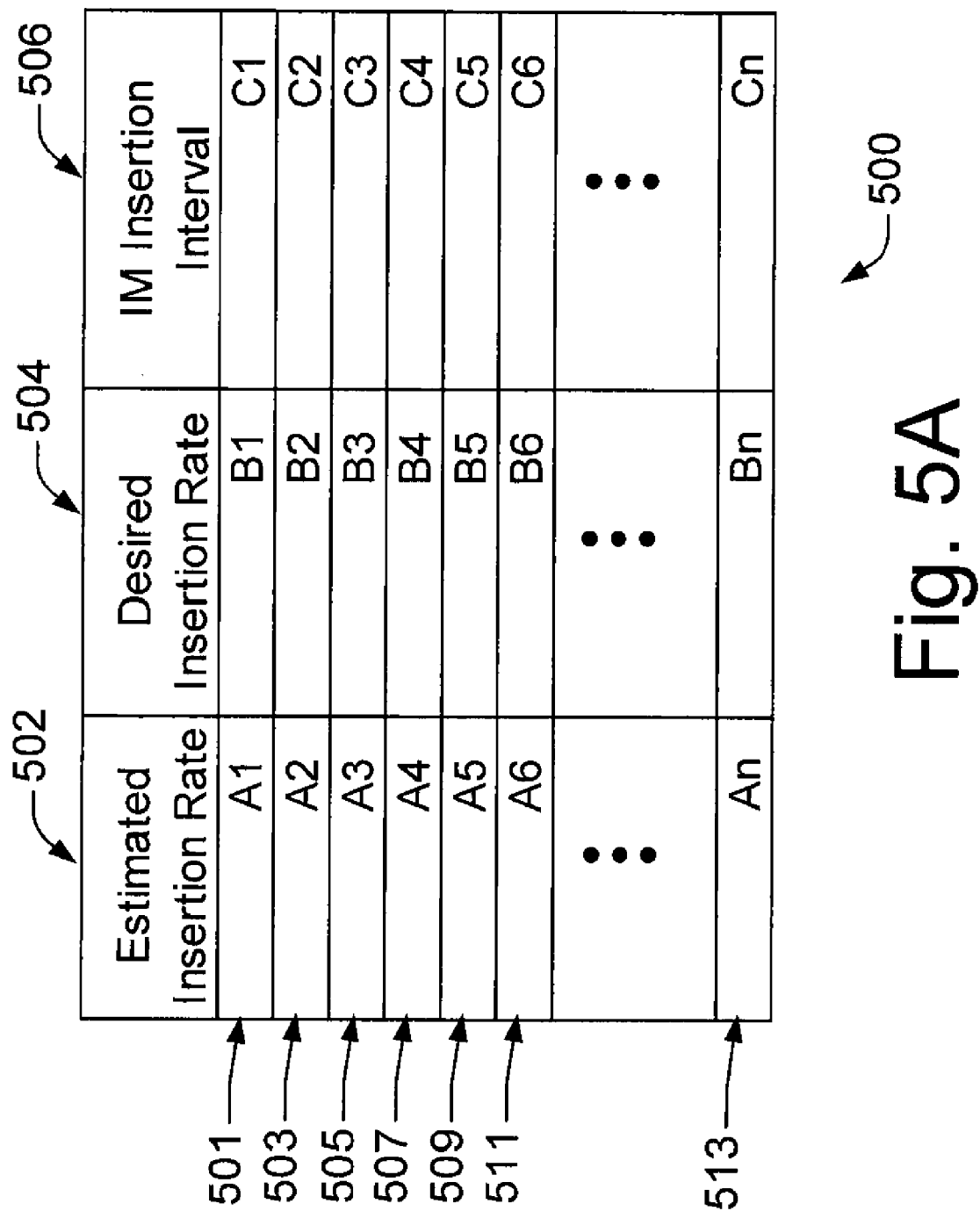
FIG. 5A shows an example of an Insertion Interval Table 500 in accordance with a specific embodiment.
Figure 5C:
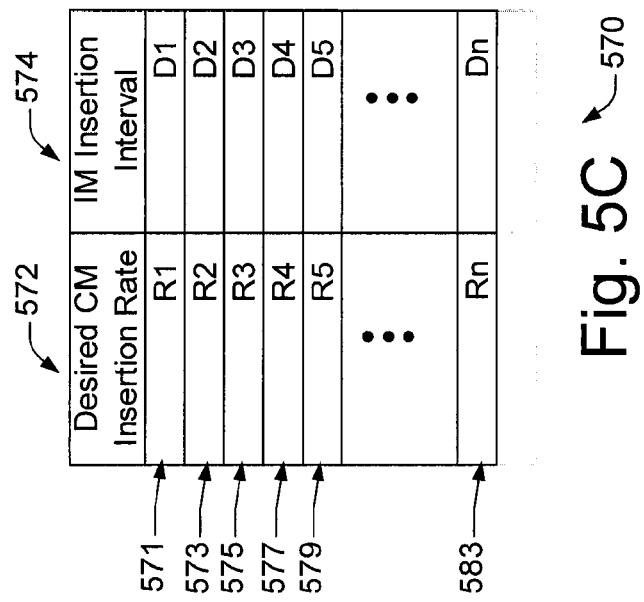
FIG. 5C shows an example of an Insertion Interval Table 570 in accordance with a specific embodiment.
Figure 5B:
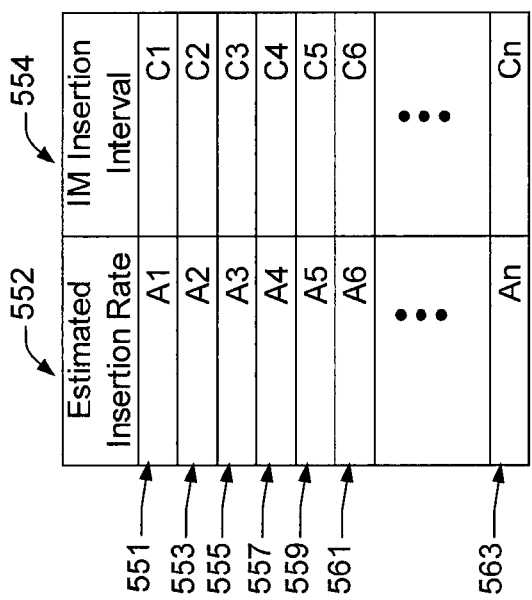
FIG. 5B shows an example of an Insertion Interval Table 550 in accordance with a specific embodiment.

For example, in at least one embodiment, one or more desired insertion intervals may be dynamically determined (e.g., in real-time) by performing a table lookup using one or more of the tables illustrated in the examples of FIGS. 5A-C. Additionally, in at least one embodiment, the insertion rate estimate value (e.g., determined at 454) may be used as a lookup key in order to determine the desired insertion interval.

FIGS. 5A-5C show different example embodiments of various data structures which may be used for facilitating implementation of one or more techniques described herein.

For example, FIG. 5A shows an example of an Insertion Interval Table 500 in accordance with a specific embodiment. As shown in the example of FIG. 5A, table 500 may be populated with various types of data such as, for example, one or more of the following (or combinations thereof): estimated insertion rate data 502, insertion interval data 506, desired insertion rate data 504, etc. In specific embodiments, the estimated insertion rate values (e.g., A1-An) may be defined according to predetermined increments and/or ranges depending on level of granularity desired (e.g., increments of 5, 10, 20, 50, 100, etc.; incremental ranges such as, for example, 0-99, 100-199, 200-299, etc). In the embodiment of FIG. 5A, for example, the values in the column at 502 may be defined according to different intervals (e.g., 20 unit intervals), although other intervals and/or predetermined values may be also be used.

In particular embodiments, the Insertion Interval Table 500 may be configured or designed to function as a lookup table. For example, in one embodiment, table 500 may include a plurality of records (e.g., 501, 503, 505, etc.), wherein each record has associated therewith: an estimated insertion rate value (e.g., 502), an insertion interval value (e.g., 506), and a desired insertion rate value (e.g., 504). In at least one embodiment, the estimated insertion rate value may be used as a lookup key to determine an associated insertion interval value and/or an associated desired insertion rate value. For example, referring to the example table of FIG. 5A, an estimated insertion rate value of A1 (e.g., as measured in modems/second) may have an associated insertion interval value corresponding to Value C1 (e.g., as measured in milliseconds), and/or may have an associated desired insertion rate corresponding to Value B1 (e.g., as measured in modems/second). In at least one embodiment, the range of insertion interval values (A1-An) in FIG. 5A may vary depending on various factors such as, for example, one or more of the following (or combinations thereof):

CMTS performance capabilities;
PRE performance capabilities;
number of nodes (e.g., cable modems) supported by the CMTS;
network conditions;
CMTS and/or PRE performance history;
network architecture;
estimated insertion rate;
etc.

For example, in one embodiment, Table I below shows example values for one embodiment of the Insertion Interval Table of FIG. 5A based, for example, on the following assumptions:

PRE1 type routing engine;
Optimal CMTS Insertion Rate=180 modem/sec;
CMTS includes 8 active line cards, in 7+1 configuration;
Each line card includes 20 upstream ports and 5 downstream port;
Each DOCSIS domain is mapped to a separate line card.

TABLE I

| Estimated Insertion Rate (per CMTS) | Desired Insertion Rate (per CMTS) | IM Insertion Interval (msec) (per DOCSIS Domain) |
|---|---|---|
| 0 | 360 | 50 |
| 20 | 340 | 148 |
| 40 | 320 | 154 |
| 60 | 300 | 161 |
| 80 | 280 | 169 |
| 100 | 260 | 178 |
| 140 | 220 | 201 |
| 160 | 200 | 216 |
| 180 | 180 | 235 |
| 200 | 160 | 258 |
| 220 | 140 | 288 |
| 240 | 120 | 327 |
| 260 | 100 | 383 |
| 280 | 80 | 466 |
| 300 | 60 | 604 |
| 320 | 40 | 881 |
| 340 | 20 | 1000 |
| 360 | 0 | 1000 |

In another example embodiment, Table II below shows example values for a different embodiment of the Insertion Interval Table of FIG. 5A based, for example, on the following assumptions:

PRE2 type routing engine;
Optimal CMTS Insertion Rate=377 modem/sec;
CMTS includes 8 active line cards, in 7+1 configuration;
Each line card includes 20 upstream ports and 5 downstream port;
Each DOCSIS domain is mapped to a separate line card.

TABLE II

| Estimated Insertion Rate (per CMTS) | Desired Insertion Rate (per CMTS) | IM Insertion Interval (msec) (per DOCSIS Domain) |
|---|---|---|
| 0 | 754 | 50 |
| 80 | 674 | 99 |
| 160 | 594 | 106 |
| 240 | 514 | 115 |
| 320 | 434 | 127 |
| 377 | 377 | 138 |
| 480 | 274 | 171 |
| 560 | 194 | 221 |
| 640 | 114 | 342 |
| 720 | 34 | 1000 |

In at least one embodiment, at least some desired insertion interval value(s) may be calculated according to the following equation:

$$IM = \begin{cases} \frac{N \times 950}{4 \times CM} + 50 & \text{if } 0 < CM < \frac{N}{4} \\ 1000 & \text{if } CM > \frac{N}{4} \end{cases} \quad (3)$$

where,

IM represents the IM insertion Interval of a given IM alignment group (e.g., for a given DOCSIS domain, line card, and/or group of interfaces);

CM represents a desired CM insertion rate value; and

N represents the number of upstream interfaces (e.g., for a given DOCSIS domain, line card, and/or group of interfaces)

Additionally, in at least one embodiment, at least some desired insertion rate value(s) may be calculated according to the following equation:

$$DIR = (2 \ast OIR) - EIR \quad (4);$$

where,

DIR represents a desired insertion rate

OIR represents an optimal insertion rate (e.g., for a given CMTS as illustrated in Table II);

EIR represents an estimated insertion rate (e.g., for a given CMTS as illustrated in Table II)

According to different embodiments, different insertion rate/insertion interval tables may be created and/or used for different physical and/or logical interfaces, channels, line cards, DOCSIS domains, CMTS chassis, and/or combinations thereof.

In another example, FIG. 5B shows an example of an alternate embodiment of Insertion Interval Table 550 in accordance with a specific embodiment. As shown in the example of FIG. 5B, table 550 may be populated with various types of data such as, for example, one or more of the following (or combinations thereof): estimated insertion rate data 552, insertion interval data 554, etc. In specific embodiments, the estimated insertion rate values may be defined according to predetermined increments and/or ranges depending on level of granularity desired.

Similar to table 500 of FIG. 5A, the Insertion Interval Table 550 may be configured or designed to function as a lookup table. For example, in one embodiment, table 550 may include a plurality of records (e.g., 551, 553, 555, etc.), wherein each record has associated therewith: an estimated insertion rate value, and an insertion interval value. In at least one embodiment, the estimated insertion rate value may be used as a lookup key to determine an associated insertion interval value (and/or other desired information).

For example, in one embodiment, Table III below shows example values for one embodiment of the Insertion Interval Table of FIG. 5B based, for example, on the following assumptions:

PRE2 type routing engine;

Optimal CMTS Insertion Rate=377 modem/sec;

Each DOCSIS domain is mapped to a separate line card.

TABLE III

| Estimated Insertion Rate (per CMTS) | IM Insertion Interval (msec) (per DOCSIS Domain) |
|---|---|
| 0 | 50 |
| 80 | 99 |

TABLE III-continued

| Estimated Insertion Rate (per CMTS) | IM Insertion Interval (msec) (per DOCSIS Domain) |
|---|---|
| 160 | 106 |
| 240 | 115 |
| 320 | 127 |
| 377 | 138 |
| 480 | 171 |
| 560 | 221 |
| 640 | 342 |
| 720 | 1000 |

Thus, for example, using the data in the example of Table III above, if it is determined that a current estimated CM insertion rate at the CMTS is about 480 modems/sec, it may be desirable to adjust the IM insertion interval value associated with a given DOCSIS domain to about 171 milliseconds. Accordingly, in one embodiment, the CMTS may schedule or allocate an IM timeslot every 171 milliseconds on each active upstream channel of the DOCSIS domain. For example, in one embodiment where the DOCSIS domain includes 20 active upstream channels, a separate IM timeslot may be concurrently or simultaneously allocated on each of the 20 upstream channels about every 171 milliseconds. In other embodiments, it may be preferable to allocate at least some IM timeslots on one or more upstream channels in a non-concurrent or non-simultaneous manner.

In yet another example, FIG. 5C shows an example of an alternate embodiment of Insertion Interval Table 570 in accordance with a specific embodiment. As shown in the example of FIG. 5C, table 570 may be populated with various types of data such as, for example, one or more of the following (or combinations thereof): desired insertion rate data 572, insertion interval data 574, etc. For purposes of illustration, it is assumed in the example of FIG. 5C that the table values and/or other data correspond to desired insertion rates and insertion intervals relating to one or more selected interface(s), line card(s), and/or DOCSIS domain(s) associated with the CMTS. In other embodiments, the values and/or other data of Table 570 may be associated with one or more different physical and/or logical interfaces, channels, line cards, DOCSIS domains, CMTS chassis, and or combinations thereof.

In specific embodiments, the desired insertion rate values of FIG. 5C may be defined according to predetermined increments and/or ranges depending on level of granularity desired. In the embodiment of FIG. 5C, for example, the values in the column at 572 have been defined according to specific predetermined values, although other intervals and/or predetermined values may be also be used.

Similar to table 500 of FIG. 5A, the Insertion Interval Table 570 may be configured or designed to function as a lookup table. For example, in one embodiment, table 570 may include a plurality of records (e.g., 571, 573, 575, etc.), wherein each record has associated therewith: a desired insertion rate value, and an associated insertion interval value. In at least one embodiment, the desired insertion rate value may be used as a lookup key to determine an associated insertion interval value (and/or other desired information).

In and example embodiment, Table IV below shows example values for one embodiment of the Insertion Interval Table of FIG. 5C based, for example, on the assumption of a DOCSIS domain having 4 upstream channels.

TABLE IV

| Desired CM Insertion Rate (per DOCSIS Domain) | IM Insertion Interval (msec) (per DOCSIS Domain) |
|---|---|
| 188 | 55 |
| 100 | 60 |
| 50 | 69 |
| 40 | 74 |
| 30 | 82 |
| 20 | 98 |
| 10 | 145 |
| 5 | 240 |
| 1 | 1000 |

According to specific embodiments, particular estimated insertion rate(s) may be paired with desired insertion rate(s), for example, in order to determine an adjustment of the insertion rate(s) for one or more physical and/or logical interfaces, channels, line cards, DOCSIS domains, CMTS chassis, and/or combinations thereof. In different embodiments, information from one or more Insertion Interval Tables may be used to determine adjustments or modifications to be made to other types of network criteria and/or operating conditions.

FIG. 6 shows a block diagram of a hybrid-fibre coaxial (HFC) network in accordance with a specific embodiment. For purposes of illustration, various aspects will be described with respect to the cable network example of FIG. 6. However, it will be appreciated that the various aspects and/or techniques described herein may also be applicable to other cable network implementations and/or other types of shared access networks.

As shown in FIG. 6, network portion 600 includes a head end (e.g., which includes CMTS 610), a plurality of nodes (e.g., cable modems such as 661, 662, 663, etc.), and a plurality of upstream and downstream channel interfaces (e.g., 605, 612, 625, 633). In one embodiment, the CMTS 610 is operable to function as the head end of the access network. In the example of FIG. 6, the CMTS is operable to communicate with a plurality of subscriber groups (e.g., 660a, 660b), wherein each subscriber group includes a plurality of cable modems. In at least one embodiment, the CMTS may communicate with selected cable modems via one or more fiber nodes (e.g., 652a, 652b). In at least one embodiment, desired combinations of upstream and/or downstream ports across different line cards may be logically grouped together to form different logical domains (e.g., logical DOCSIS domains).

In one embodiment, the CMTS 610 may include a plurality of physically distinct line cards, e.g. Line Card A 603 and Line Card B 604. Each line card may include one or more upstream ports (e.g., 605, 625) and/or downstream ports (e.g., 612, 633). In one embodiment, each line card within CMTS 610 may include a respective MAC controller (e.g., 606, 608).

In specific embodiments, domain assignments within the CMTS may be flexible and may be logically based. For example, in at least one embodiment, a separate DOCSIS domain (or CMTS domain) may be assigned to one or more selected fiber nodes within the HFC network. Alternatively, a single DOCSIS domain may be allocated to the entire CMTS chassis, which may be connected to one or more fiber nodes.

Figure 7:
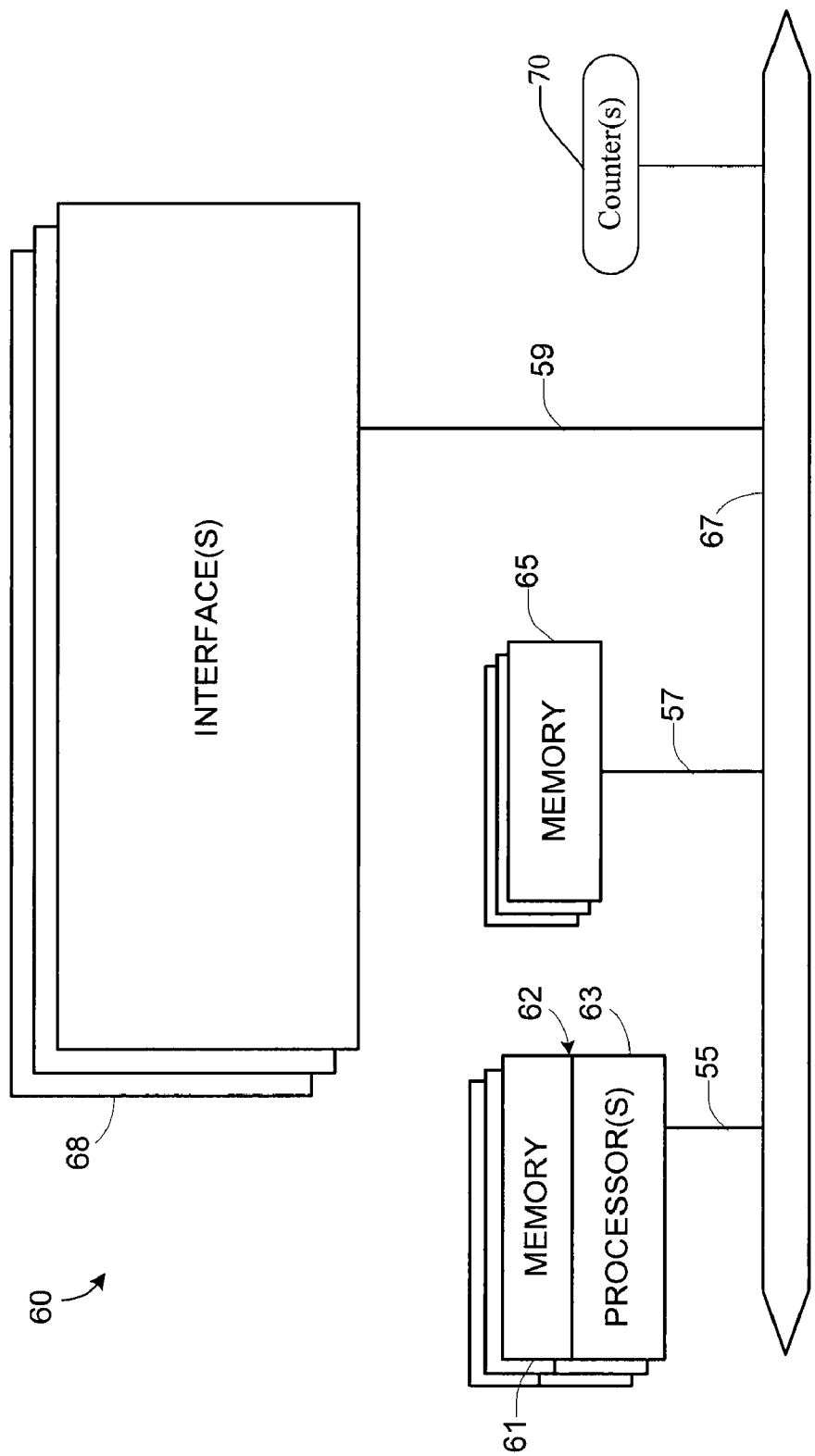
FIG. 7 shows a block diagram of a specific embodiment of a Cable Modem Termination System (CMTS) in accordance with a specific embodiment

FIG. 7 shows a block diagram of a specific embodiment of a Cable Modem Termination System (CMTS) 610 in accordance with a specific embodiment. In at least one embodiment, the CMTS 610 may comprise at least one packet routing engine ("PRE"), herein also referred to as a "routing engine." In alternate embodiments, the CMTS may include a multiple packet routing engines ("PREs").

Generally, at least a portion of the various techniques described herein may be implemented on software and/or hardware. For example, they can be implemented in an operating system kernel, in a separate user process, in a library package bound into network applications, on a specially constructed machine, or on a network interface card. In a specific embodiment, at least some techniques described herein may be implemented via software such as an operating system or in an application running on an operating system.

A software or software/hardware hybrid implementation of various techniques described herein may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, in one embodiment, the CMTS 610 may be implemented using specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In other embodiments, various techniques may be implemented on a general-purpose network host machine such as a personal computer or workstation. Further, at leased some features described herein may be at least partially implemented on a card (e.g., an interface card) for a network device or a general-purpose computing device.

Referring to the example of FIG. 7, CMTS 610 may include a master central processing unit (CPU) 62, interfaces 68, and at least one bus 67 (e.g., a PCI bus). When acting under the control of appropriate software or firmware, the CPU 62 may be responsible for implementing specific functions associated with the functions of a desired network device. For example, the CPU 62 may be responsible for analyzing packets, encapsulating packets, forwarding packets to appropriate network devices, calculating insertion rate estimates and/or desired insertion interval values, facilitating cable modem network sign-on activities, etc. In one embodiment, the CPU 62 may accomplish at least a portion of such functions under the control of software including an operating system, and any appropriate applications software.

CPU 62 may include one or more processors 63 such as a processor from the Motorola, AMD, Intel family of microprocessors, and/or the MIPS family of microprocessors. In an alternative embodiment, processor 63 may be implemented as specially designed hardware for controlling the operations of CMTS. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the CMTS 610. Among the interfaces that may be provided are Ethernet interfaces, baseband interfaces, backplane interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management, etc. By providing separate processors for the communications intensive tasks, these interfaces allow the master microprocessor 62 to efficiently perform other functions such as, for example, routing computations, network diagnostics, security functions, etc.

As shown in the example of FIG. 7, CMTS 610 may also include appropriate hardware and/or software suitable for implementing one or more counters 70. According to specific embodiments, at least one counter may be operable to track information relating to CM ranging requests, such as that described, for example, with respect to FIG. 2A. In at least one embodiment, at least one counter may be operable to track information relating to active or online CMs, such as that described, for example, with respect to FIG. 2B.

In particular embodiments, the counter values may be used, for example, to determine an adjustment of the frequency of initial ranging or initial maintenance opportunities with respect to different physical and/or logical interfaces, channels, line cards, DOCSIS domains, and/or CMTS chassis. In different embodiments, the number of CM ranging requests may be used for a different purpose or purposes, such as, for example, determining an adjustment of different settings, parameters, and/or other characteristics relating to network performance and/or cable modem sign-on procedures.

Although the system shown in FIG. 7 illustrates one example of a CMTS device, it is by no means the only device architecture which may be used for implementing one or more of the techniques and/or features described herein. For example, an architecture having a single processor that handles communications as well as routing computations, etc. may be used. Further, other types of interfaces and media could also be used with the network device.

As illustrated in the example of FIG. 7, the CMTS it may employ one or more memories and/or memory modules (such as, for example, memory block 65), which, for example, may be operable to store data, program instructions for the general-purpose network operations and/or other information relating to the functionality of the cable modem ranging and/or other CM sign-on activities described herein. The program instructions may specify an operating system and one or more applications, for example. Such memory or memories may also be configured to store data structures and/or other specific non-program information described herein. In at least one embodiment, the memory module(s) may non-volatile and/or volatile memory such as, for example, random access memory (e.g., synchronous dynamic random access memory (SDRAM)), etc.

Because such information and program instructions may be employed to implement the systems and methods described herein, various aspects are directed to machine-readable storage media that include program instructions, state information, etc. for performing various operations described herein. Examples of machine-readable storage media include, but are not limited to, magnetic media such as, for example, hard disks, floppy disks, and magnetic tape; optical media such as, for example, CD-ROM disks; magneto-optical media such as, for example, floptical disks; and hardware devices that are specially configured to store and perform program instructions, such as, for example, read-only memory devices (ROM) and random access memory (RAM). Examples of program instructions include both machine code, such as, for example, produced by a compiler, and files containing higher level code that may be executed by the computer using an interpreter.

One skilled in the art would appreciate that multiple processors, a variety of memory formats, and/or multiple system controllers, for example, can be used in this context as well as in other contexts described herein. The program instructions may control the operation of an operating system and/or one or more applications, for example. The memory or memories may also be configured to store data structures, insertion interval tables, and/or other specific non-program information described herein.

Because such information and program instructions may be employed to implement the systems/methods described herein, machine readable storage media (e.g., which includes program instructions, state information, etc.) may be used for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
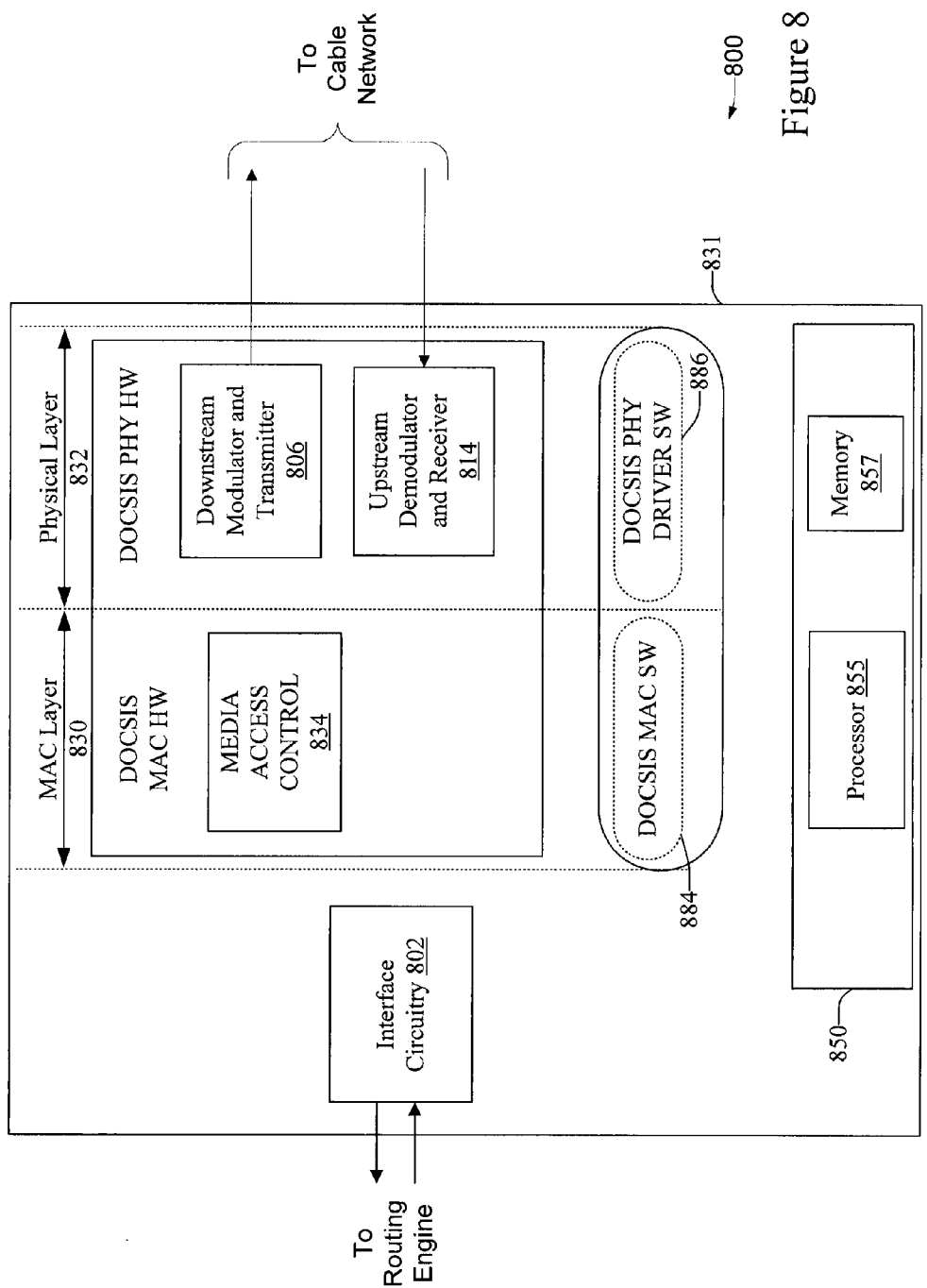
FIG. 8 shows a specific embodiment of a line card in accordance with a specific embodiment.

According to different embodiments, one or more of the routing engines may be configured to communicate with a plurality of different line cards such as that illustrated, for example, in FIG. 8 of the drawings. According to a specific embodiment, the line cards may include different types of line cards which have been specifically configured to perform specific functions. For example, in at least one embodiment, some line cards may be implemented as radio-frequency (RF) line cards which have been configured and/or designed for use in a cable network. Additionally, some line cards may be implemented as network interface cards which have been configured and/or designed to interface with different types of external networks (e.g. WANs, LANs) utilizing different types of communication protocols (e.g. Ethernet, Frame Relay, ATM, TCP/IP, etc). For example, in at least one embodiment, one or more line cards may be operable to communicate with external data sources via, for example, optical fiber, microwave link, satellite link, and/or through various media. A data network interface may include hardware and software for interfacing to various networks. According to various embodiments, a data network interface may be implemented on a line card as part of a conventional router for a packet-switched network. Using this type of configuration, the CMTS may be able to send and/or receive IP packets to and from the data network interface using, for example, network layer software.

According to a specific embodiment, the operations associated with obtaining an IP address for cable modems may be implemented by appropriate network layer software at the CMTS. This may involve the CMTS communicating with a DHCP server (not shown) via a data network interface, for example.

In at least one embodiment, at least a portion of the line cards may include respective interface circuitry for providing an appropriate interface between the host line card, other line cards, and/or the routing engine(s). According to specific embodiments, the interface circuitry may be operable to function as a translator that converts conventional formats of data received at the line cards to a suitable protocol format for transmission from the line card to appropriate routing engine(s), line card(s), and/or other network devices.

At least some CMTS (or head end system) embodiments may be implemented on various general purpose CMTSs. In a specific embodiment, systems may be specially configured CMTSs such as, for example, specially configured models in the uBR-7200 and uBR-10012 series of CMTSs available from Cisco Systems, Inc. of San Jose, Calif.

Although the system shown in FIG. 7 represents one specific CMTS architecture, it is by no means the only CMTS architecture on which embodiments can be implemented. For example, other types of interfaces and media could also be used with the CMTS.

FIG. 8 shows a specific embodiment of a line card 800 in accordance with a specific embodiment. According to a specific embodiment, the line card 800 may be configured and/or designed to implement selected aspects of the DOCSIS functionality such as, for example, DOCSIS MAC functionality and/or other functionality which conventionally has been implemented at the CMTS.

In the specific embodiment as shown in FIG. 8, line card 800 may be operable to provide functions on several network layers, including a physical layer 832, and a Media Access Control (MAC) layer 830. Generally, the physical layer is responsible for receiving and transmitting RF signals on the cable plant. Hardware portions of the physical layer include at least one downstream modulator and transmitter 806 and/or at least one upstream demodulator and receiver 814. The physical layer also includes software 886 for driving the hardware components of the physical layer.

Upstream optical data signals (e.g., representing one or more packets) arriving via an optical fiber node may be converted to electrical signals, and then demodulated by the demodulator/receiver 814. The demodulated information is then passed to MAC layer block 830.

One purpose of MAC layer 830 is to encapsulate, with MAC headers, downstream packets and decapsulate, of MAC headers, upstream packets. In at least one embodiment, the encapsulation and decapsulation proceed as dictated by the above-mentioned DOCSIS standard for transmission of data and/or other information. The MAC headers include addresses to specific modems (if sent downstream), and/or to the CMTS (if sent upstream). Note that the cable modems may also include MAC addressing components. For example, in one embodiment of the cable modems, these components encapsulate upstream data with a header containing the MAC address of the CMTS.

MAC layer 830 includes a MAC hardware portion 834 and a MAC software portion 884. The MAC layer software portion may include software relating to DOCSIS MAC functionality, etc. The MAC layer hardware and software portions operate together to provide the MAC functionality, such as, for example, DOCSIS MAC functionality. In one embodiment, MAC controller 834 may be dedicated to performing some MAC layer functions, and may be distinct from processor 855.

In one embodiment, upstream information processed by MAC layer block 830 may be forwarded to interface circuitry 802. As described previously, interface circuitry 802 includes appropriate hardware and/or software for converting data formats received at the line cards to a suitable protocol format for transmission from the line card to other appropriate devices, components and/or systems.

In one embodiment, when a packet is received from the routing engine at the interface circuitry 802, the packet may be passed to MAC layer 830. The MAC layer 830 may transmit information via a one-way communication medium to downstream modulator and transmitter 806. Downstream modulator and transmitter 806 may be operable to take the data (or other information) in a packet structure and convert it to modulated downstream frames, such as, for example, MPEG and/or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data may likewise be modulated using, for example, QAM16 and/or QSPK. According to a specific embodiment, the modulated data is converted from IF electrical signals to RF electrical signals (or vice-versa) using one or more electrical signal converters (not shown).

As shown in FIG. 8, line card 800 includes a central hardware block 850 including one or more processors 855 and memory 857. These hardware components interact with software and other hardware portions of the various layers within the line card. They provide general purpose computing power for much of the software. Memory 857 may include, for example, I/O memory (e.g. buffers), program memory, shared memory, etc. One or more data structures used for implementing one or more embodiments may reside in such memory. In at least one embodiment, the software entities 884, 886 may be implemented as part of a network operating system running on hardware 850. At least a part of the interface functionality described herein may be implemented in software as part of the operating system. In the example of FIG. 8, such software may be part of MAC layer software 884, and/or may be closely associated therewith. Of course, at least a portion of the interface logic described herein could reside in hardware, software, or some combination of the two.

According to specific embodiments, at least a portion of the typically employed by the CMTS during registration and pre-registration may be performed at the MAC layer of the line card 800 and/or at other portions of the CMTS 610.

According to a specific embodiments, at least a portion of functions described herein which may be performed by the CMTS (e.g. FIG. 7), line cards (e.g. FIG. 8), and/or selected components thereof, may be implemented in a centralized CMTS system (e.g., residing at the Head End Complex of the cable network), and/or may be implemented at one or more distributed CMTS (DCMTS) systems (e.g. residing at one or more fiber nodes).

One or more embodiments may be implemented in any computer network having a standardized protocol for utilizing a central termination system (e.g. Head End) to schedule timeslots for remote stations and/or nodes on one or more return (or upstream) channel(s). In wireless networks, the central termination system may be referred to as a Head End and/or wireless base station. In satellite networks, the central termination system may be referred to as a master controlling station.

FIG. 9 shows an example of a wireless data communication system 900 in accordance with a specific embodiment. As shown in FIG. 9, the wireless system may include a central termination system (e.g., head end) 920. In at least one embodiment, the head end may include an access controller and/or access control system (ACS) 922 which communicates with a plurality of wireless nodes 950, and coordinates access between each of the wireless nodes and the head end 920. The access controller 922 may include memory and at least one processor. In a specific embodiment, the functions of the access controller 922 may be analogous to that of the CMTS described above with respect to cable modem networks. It may serve as a router and/or switch as well.

In at least one embodiment, the head end 920 may be operable to communicate with the plurality of wireless nodes 950 via any one of a plurality of wireless transmitting and receiving devices 910. As shown in FIG. 9, for example, the plurality of wireless transmitting and receiving devices 910 may include satellite base stations 902, orbital satellites 906, radio towers 904, etc.

In the wireless system (e.g., represented by FIG. 9) the plurality of nodes and/or hosts may correspond to a plurality of wireless nodes 950 which use at least one shared access channel to communicate with at least one access control system 922 located at the head end of the wireless system. For example, in a specific embodiment (such as, for example, one which may be analogous to that of cable modem networks), the head end 920 of the wireless computer system communicates with the plurality of nodes 950 via one or more downlink channels 907 and/or one or more uplink channels 909. At least one downlink channel 907 may be configured as a broadcast-type channel utilized by the head end to communicate with an associated group of wireless nodes within the wireless network. At least one of the uplink channel(s) 909 may be configured or designed to as a shared-access channel, which is utilized by a group of wireless nodes (e.g., analogous to cable modems) to communicate with the head end 920. The access controller 922 stores registration parameters for the various nodes that it services. It may also store the IP addresses for nodes that it services.

In a specific embodiment, the registration process and information is similar to that of the cable network CMTSs described above. Moreover, one or more embodiments for interface capability over a shared access data network may be implemented in wireless system 900.

The wireless devices and/or nodes 950 may include any one of a number of wireless transmitting/receiving devices. For example, a satellite dish 952 may be used to communicate with the head end 920 via the uplink and downlink channels. The satellite dish may, for example, be connected to a local area network (LAN) 930 which, may be connected to one or more computer systems 932. Another wireless device may be a portable/wireless computer system 954, which is able to transmit and receive information to the head end via uplink and downlink channels 907 and 909. Other wireless devices 956 may include, for example, wireless telephones, handheld computing devices, etc.

In specific embodiments where the uplink and downlink channels within the wireless system 900 may be utilized in a manner similar to that of the upstream and downstream channels of a cable modem network, the above-described interface techniques may easily be implemented in wireless system 900 using one or more of the techniques described herein. Moreover, one or more embodiments may be easily implemented in any computer network which uses shared access channels for communicating between a centralized computing system and one or more remote nodes.

FIGS. 10A-C illustrate example embodiments of different Initial Maintenance sub-channels which may be associated with one or more different upstream channels (or links) in an access network such as, for example, a cable network.

FIG. 10A shows an example of an Initial Maintenance Sub-channel 1000 in accordance with a specific embodiment. As illustrated in the example of FIG. 10A, Initial Maintenance (IM) timeslots (e.g., 1002, 1004, 1006) have been allocated on an upstream channel (e.g., thereby forming IM sub-channel 1000) according to a first insertion interval value (or first range of insertion interval values) which may be desirable for use when normal and/or standard ranging procedures are in effect. In the example of FIG. 10A, the insertion interval may be represented by INT-A, which may correspond to the time period between the start of consecutive IM timeslots (e.g., 1002, 1004) on the IM sub-channel 1000.

According to a specific embodiment, the insertion interval value (or range of values) which may be desirable for use with the CMTS (e.g., as a whole) and/or for use on an upstream channel when normal and/or standard ranging procedures are in effect may vary depending upon various factors such as, for example: the number nodes (e.g., CMs) in the network; the number of upstream and/or downstream channels; type(s) of modulation schemes used; CMTS and/or PRE architecture; CMTS and/or PRE capabilities; CM sign-on operations and/or stages to be performed; etc. As an example, an insertion interval value in the range of 50 msec-1 second may be desirable for use at the CMTS (and/or for use on an upstream channel) when normal and/or standard ranging procedures are in effect.

FIG. 10B shows an example of an Initial Maintenance Sub-channel 1030 in accordance with a specific embodiment. As illustrated in the example of FIG. 10B, Initial Maintenance (IM) timeslots (e.g., 1032, 1034, 1036, etc.) have been allocated on an upstream channel (e.g., thereby forming IM sub-channel 1030) according to a second insertion interval value (or second range of insertion interval values) which may be desirable for use when "throttle up" ranging procedures are in effect. In the example of FIG. 10B, the insertion interval may be represented by INT-B, which may correspond to the time period between the start of consecutive IM timeslots (e.g., 1032, 1034) on the IM sub-channel 1030.

According to a specific embodiment, the insertion interval value (or range of values) which may be desirable for use with the CMTS (e.g., as a whole) and/or for use on an upstream channel when "throttle up" ranging procedures are in effect may vary depending upon various factors such as, for example: the number nodes (e.g., CMs) in the network; the number of upstream and/or downstream channels; type(s) of modulation schemes used; CMTS and/or PRE architecture; CMTS and/or PRE capabilities; CM sign-on operations and/or stages to be performed; etc. As an example, an insertion interval value in the range of 50-450 milliseconds may be desirable for use at the CMTS (and/or for use on an upstream channel), may be desirable for use at the CMTS when "throttle up" ranging procedures are in effect.

FIG. 10C shows an example of an Initial Maintenance Sub-channel 1060 in accordance with a specific embodiment. As illustrated in the example of FIG. 10C, Initial Maintenance (IM) timeslots (e.g., 1062, 1064, etc.) have been allocated on an upstream channel (e.g., thereby forming IM sub-channel 1060) according to a second insertion interval value (or second range of insertion interval values) which may be desirable for use when "throttle down" ranging procedures are in effect. In the example of FIG. 10C, the insertion interval may be represented by INT-C, which may correspond to the time period between the start of consecutive IM timeslots (e.g., 1062, 1064) on the IM sub-channel 1060.

According to a specific embodiment, the insertion interval value (or range of values) which may be desirable for use with the CMTS (e.g., as a whole) and/or for use on an upstream channel when "throttle down" ranging procedures are in effect may vary depending upon various factors such as, for example: the number nodes (e.g., CMs) in the network; the number of upstream and/or downstream channels; type(s) of modulation schemes used; CMTS and/or PRE architecture; CMTS and/or PRE capabilities; CM sign-on operations and/or stages to be performed; etc. As an example, an insertion interval value in the range of 100-1000 milliseconds may be desirable for use at the CMTS (and/or for use on an upstream channel) may be desirable for use on an upstream channel when "throttle down" ranging procedures are in effect.

In at least one embodiment, the values of the desired insertion interval(s) and/or IM rate(s) may be relative to the CMTS, while, in other embodiments, the values of the desired insertion interval(s) and/or IM rate(s) may be relative to different physical and/or logical interfaces, channels, line cards, DOCSIS domains, etc.

As illustrated in the examples of FIG. 10B, the number of available initial ranging opportunities (e.g., on a given upstream channel) during "throttle up" ranging procedures may be greater than the number of available initial ranging opportunities (e.g., on a given upstream channel) during normal and/or standard ranging procedures. Additionally, as illustrated in the examples of FIG. 10C, the number of available initial ranging opportunities (e.g., on a given upstream channel) during "throttle down" ranging procedures may be less than the number of available initial ranging opportunities (e.g., on a given upstream channel) during normal and/or standard ranging procedures.

In different embodiments, the desired insertion interval value(s) and/or IM rate value(s) may be predetermined, determined dynamically (e.g., via use of one or more formulas, equations and/or algorithms), read from a table (such as, for example, an insertion interval table, such as those illustrated in FIGS. 5A-C), provided by another entity (e.g., remote system, local component, user input, etc.), and/or some combination thereof.

Figure 11:
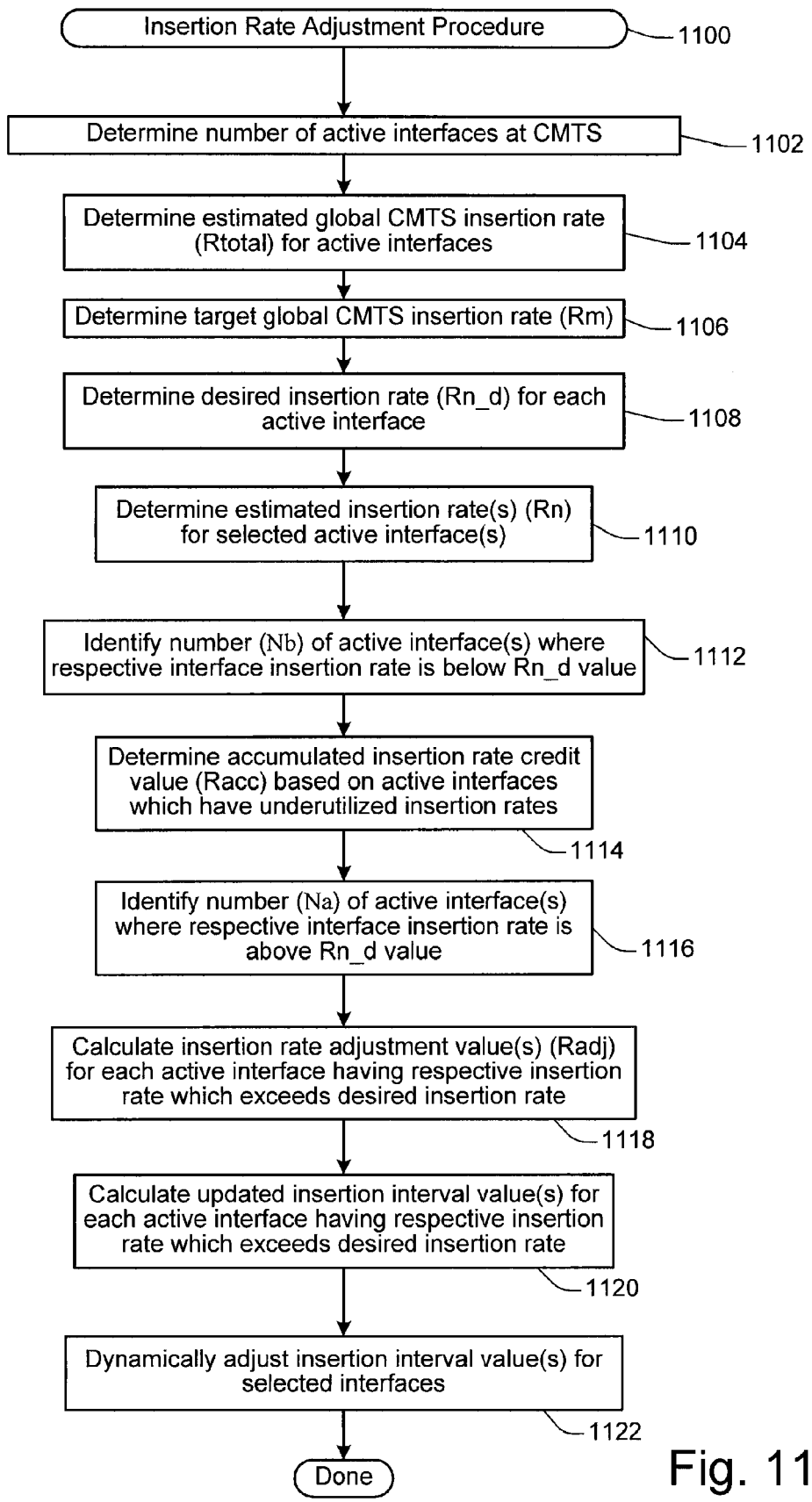
FIG. 11 shows a flow diagram of Interface Insertion Rate Adjustment Procedure in accordance with a specific embodiment.

FIG. 11 shows an example of an Insertion Rate Adjustment Procedure 1100 in accordance with a specific embodiment. In at least one embodiment, at least a portion of the functionality relating to the Insertion Rate Adjustment Procedure may be implemented at the CMTS, such as, for example, the CMTS 610 illustrated in FIG. 6. In at least one embodiment, separate instances of the Insertion Rate Adjustment Procedure may be initiated (e.g., concurrently and/or consecutively) for different physical and/or logical interfaces, channels, line cards, DOCSIS domains, and/or combinations thereof.

In specific embodiments, the Insertion Rate Adjustment Procedure may be implemented at may be initiated or implemented at specified intervals, such as, for example: at fixed time intervals; at periodic intervals (e.g., about every 10 seconds, about every 1-60 seconds, etc.); upon detection of certain triggering events and/or conditions; etc. In at least one embodiment, the Insertion Rate Adjustment Procedure may be implemented with sufficient frequency to enable specified minimum number of nodes (e.g., CMs) to come online within a specified time interval. For example, in one embodiment, In at least one embodiment, the Insertion Rate Adjustment Procedure may be implemented with sufficient frequency to enable 40,000 CMs to come online (which, for example, may include completing registration and/or other sign-on activities at the CMTS) within a time interval of 300 seconds or less.

In the example of FIG. 11, it is assumed, for purposes of illustration, that the Insertion Rate Adjustment Procedure is being used to analyze, modify, and/or generate various information relating to insertion rates and/or insertion interval values associated with one or more CMTS interfaces. However, in other embodiments, the Insertion Rate Adjustment Procedure may be used to analyze, modify, and/or generate and/or modify various information relating to insertion rates and/or insertion interval values associated with one or more CMTS line cards, DOCSIS domains, communication channels, and/or combinations thereof. In such alternate embodiments, the Insertion Rate Adjustment Procedure may be adapted or modified accordingly to accommodate different implementation specific embodiments.

As shown at 1102 of FIG. 11, a number of active interfaces at the CMTS may be determined. In at least one embodiment, the number of active interfaces may include physical and/or logical interfaces such as those associated with one or more line cards, for example.

At 1104, an estimated global CMTS insertion rate ($R_{total}$) may be determined. In one embodiment, the estimated global CMTS insertion rate may represent an aggregated total of insertion rates for each active interface at the CMTS. In at least one embodiment, the estimated global CMTS insertion rate may represent the rate at which CMs are being inserted into the cable network (e.g., which includes CM registration at the CMTS).

As shown in the example of FIG. 11 at 1106, a target global CMTS insertion rate ($R_m$) may be determined. In at least one embodiment, the target global CMTS insertion rate ($R_m$) may represent an optimal insertion rate for the CMTS chassis. In at least one embodiment, the "optimal" insertion rate for a given CMTS (and/or other head end system) may be based on a variety of different criteria such as, for example, one or more of the following (or combinations thereof):
  CMTS architecture;
  CMTS performance capabilities;
  PRE performance capabilities;
  number of nodes (e.g., cable modems) supported by the CMTS;
  network conditions;
  CMTS and/or PRE performance history;
  network architecture;
  activities and/or operations which may be required to be implemented as part of the network sign-on process (such as, for example, initial ranging, periodic ranging, Early Authentication and Encryption (EAE), DHCP, TFTP, time of day, registration, etc.);
  etc.

In at least one embodiment, the "optimal" insertion rate for a given CMTS may be determined based upon laboratory tests and/or other tests and/or simulations. According to specific embodiments, the optimal insertion rate for a given vendor's CMTS may be determined and/or specified by the vendor. For example, in one embodiment where the CMTS is implemented using a Cisco a PRE-1 type packet routing engine, the CMTS may have an associated optimal insertion rate of 180 modems/second. In another embodiment where the CMTS is implemented using a Cisco a PRE-2 type packet routing engine, the CMTS may have an associated optimal insertion rate of 377 modems/second.

In other embodiments the target global CMTS insertion rate ($R_m$) may represent a desired insertion rate for the CMTS chassis. In one embodiment, the desired insertion rate may be calculated using optimal insertion rate information. For example, as illustrated in Table I and Table II above, different desired insertion rates may be mapped to or associated with different estimated insertion rates.

In some embodiments, at least some values representing different desired insertion rates may be determined by using a table, such as, for example, one of the tables illustrated in FIGS. 5A and 5B. In some embodiments, at least some values representing different desired insertion rates may be determined dynamically, such as, for example, by using a formula and/or equation such as Equation (4) above.

As shown in the example of FIG. 11 at 1108, a desired insertion rate $R_{n\_d}$ for each active interface may be determined. In some embodiments, $R_{n\_d}$ may be determined, for example, by dividing $R_m$ by the total number of active interfaces. In different embodiments, $R_{n\_d}$ may be determined other techniques, such as, for example, looking up a value in a table, using an equation and/or formula, and/or some combination thereof.

As shown in the example of FIG. 11 at 1110, a respective estimated insertion rate ($R_n$) for each (or selected) active interface(s) may be determined. In some embodiments, an $R_n$ value for a given interface may represent the estimated rate at which CMs associated with that interface are being inserted into the cable network.

As shown in the example of FIG. 11 at 1112, a value ($N_b$) may be determined which represents the number of active interface(s) identified as having an associated $R_n$ value which is less than or below the $R_{n\_d}$ value. For example, in some embodiments, $N_b$ may be used to track and/or count "underutilized" interfaces which have underutilized insertion rates and/or which are operating under or below specified capacity or resource utilization level(s).

As shown in the example of FIG. 11 at 1114, an accumulated insertion rate credit value ($R_{acc}$) may be determined, for example, using information relating to active interfaces which have underutilized insertion rates. In some embodiments, interfaces with underutilized insertion rates may include those where the respective estimated interface insertion rate ($R_n$) value is below the $R_{n\_d}$ value (such as, for example, the "underutilized" interfaces identified at 1112). In at least one embodiment, the $R_{acc}$ value may be calculated according to the formula:

$$R_{acc} = \sum_{j}^{i=1} (R_{n\_d} - R_n(i)); \quad (5)$$

where:
- (i) represents the each underutilized interface; and
- $R_n(i)$ represents the respective $R_n$ value associated with each underutilized interface.

As shown in the example of FIG. 11 at 1116, a value ($N_a$) may be determined which represents the number of active interface(s) identified as having an associated $R_n$ value which is above or greater than the $R_{n\_d}$ value. For example, in some embodiments, $N_a$ may be used to track and/or count "overutilized" interfaces which have overutilized insertion rates and/or which are operating greater than or above specified capacity or resource utilization level(s).

As shown in the example of FIG. 11 at 1118, a respective insertion rate adjustment value ($R_{adj}$) may be calculated or determined for each active interface having a respective estimated insertion rate value ($R_n$) which exceeds the desired insertion rate $R_{n\_d}$. In some embodiments, $R_{adj}$ may be determined by using a formula, equation, algorithm and/or combinations thereof. For example, in one embodiment, $R_{adj}$ may be determined according to the formula:

$$R_{adj} = R_{n\_d} + \frac{R_{acc}}{N_a}. \quad (6)$$

For example, in some embodiments, $R_{adj}$ may be calculated by dividing the accumulated insertion rate credit value ($R_{acc}$) by the number of overutilized active interfaces ($N_a$) (i.e., those interfaces which could use additional CM insertion resources), and adding the result to the previously computed desired insertion rate value ($R_{n\_d}$) for each active interface. In at least one embodiment, a separate $R_{adj}$ value may be individually calculated for each active overutilized interface. In other embodiments, a common (e.g., averaged) $R_{adj}$ value may be calculated and used for each active overutilized interface According to different embodiments, the $R_{adj}$ value(s) may be determined using a variety of different techniques, such as, for example via the use of equation (s), formula (s), algorithm(s), table lookup(s), and/or combinations thereof.

As shown in the example of FIG. 11 at 1120, updated insertion interval value(s) may be calculated for each of the active, overutilized interfaces. For example, in one embodiment, the updated insertion interval value(s) may be calculated using Equation (3) above. In other embodiments, the updated insertion interval value(s) may be determined via table lookup using, for example, an insertion interval table such as that illustrated in FIG. 5C and/or Table IV above.

In at least one embodiment, at least some of the updated insertion interval value(s) may be determined using the $R_{adj}$ value(s). For example, in one embodiment, an $R_{adj}$ value for a given IM alignment group (such as, for example, a given interface, group of interfaces, line card and/or DOCSIS domain) may correspond to (or be expressed as) a desired insertion rate value which may be used as a key to perform a table lookup (e.g., using the Insertion Interval Table of FIG. 5C) to determine an associated updated insertion interval value for that particular IM alignment group.

As shown in the example of FIG. 11 at 1122, the insertion interval value(s) for selected may be automatically and/or dynamically adjusted in accordance with the updated insertion interval values(s) associated with each interface. In specific embodiments, the selected interfaces may include overutilized active interfaces such as those having respective estimated insertion rates which exceed their associated target insertion rate. In particular embodiments, the insertion interval values for the selected interface(s) may be adjusted in accordance with the updated insertion interval value(s) calculated at 1120. In at least one embodiment, the dynamic adjustment of the insertion interval values for the selected interfaces (and/or, line cards, DOCSIS domain, IM alignment groups) may have the effect of throttling down the insertion rates of the overutilized interfaces to newly desired insertion rates (e.g., corresponding the $R_{adj}$ insertion rate value associated with each overutilized interface.)

It will be appreciated that one or more embodiments are not limited to cable networks, and may be applied to various types of access networks which uses at least one shared access communication channel to communicate between a plurality of nodes in the network and a head end of the network.

Although illustrative embodiments and applications of the various embodiments described herein are shown and described herein, many variations and modifications are possible which remain within the concept, scope, and spirit of the disclosed embodiments, and these variations would become clear to those of ordinary skill in the art after perusal of this application. Moreover, in at least some embodiments, various procedural operations such as those described herein may be implemented in alternative order and/or may be omitted. Accordingly, the example embodiments described herein are to be considered as illustrative and not restrictive, and the various embodiments are not to be limited to the details given herein, but may be modified within the scope and equivalents of the appended claims.

What is claimed is:

1. A method for facilitating communication between nodes and a head end of an access network, the access network including at least one upstream channel and at least one downstream channel, the access network further including a head end, the method comprising: determining a first insertion rate estimate relating to an estimated number of nodes attempting to sign-on to the access network during a first time interval; dynamically adjusting, using the first insertion rate estimate, a frequency of occurrence of initial maintenance opportunities available to a first plurality of network nodes during a second time interval, determining a number R1 of initial ranging requests received at the head end during a second time interval; determining a number R2 of initial ranging requests received at the head end during a third time interval; and calculating the first insertion rate estimate using data relating to R1 and R2.

2. The method of claim 1 further comprising:
identifying a first plurality of interfaces at the head end for communicating with the first plurality of network nodes, the first plurality of interfaces including a first interface and a second interface;
dynamically adjusting a frequency of occurrence of initial maintenance opportunities on the first interface during the second time interval in accordance with a first insertion interval value; and
dynamically adjusting a frequency of occurrence of initial maintenance opportunities on the second interface during the second time interval in accordance with a second insertion interval value.

3. The method of claim 2 further comprising:
determining a second insertion rate estimate associated with the first interface;
determining a third insertion rate estimate associated with the second interface;
determining the first insertion interval value using the second insertion rate estimate; and
determining the second insertion interval value using the third insertion rate estimate.

4. The method of claim 1 further comprising:
detecting an occurrence of a first condition or event; and
initiating, in response to the detection of the first condition or event, at least one action for dynamically adjusting the frequency of occurrence of initial maintenance opportunities available to the first plurality of network nodes during the second time interval;
wherein the first condition or event includes at least one criteria selected from a group of criteria consisting of: a network failure, a failure at the head end, the head end being off-line, and a number of nodes currently registered at head end being below a specified minimum threshold value.

5. The method of claim 1 further comprising:
dynamically determining, using the first insertion rate estimate, a first insertion interval value relating to a frequency of occurrence of initial maintenance opportunities available to the first plurality of network nodes during the second time interval.

6. The method of claim 1 further comprising:
dynamically increasing the first insertion interval value in response to a determination that the first insertion rate estimate is lower than a first value; and
dynamically decreasing the first insertion interval value in response to a determination that the first insertion rate estimate is higher than the first value.

7. The method of claim 1 wherein said access network is a cable network implemented in accordance with a DOCSIS standardized protocol, and wherein said nodes are cable modems.

8. A head end system of an access network comprising: at least one processor; at least one interface operable to provide at least one communication link a first plurality of nodes in the access network; at least one counter for tracking initial ranging requests received from the first plurality of nodes; and memory; the head end system being operable to: determine a first insertion rate estimate relating to an estimated number of nodes attempting to sign-on to the access network system during a first time interval; dynamically adjust, using the first insertion rate estimate, a frequency of occurrence of initial maintenance opportunities available to a first plurality of network nodes during a second time interval, determine a number R1 of initial ranging requests received at the head end during a second time interval; determine a number R2 of initial ranging requests received at the head end during a third time interval; and calculate the first insertion rate estimate using data relating to R1 and R2.

9. The system of claim 8 being further operable to:
identify a first plurality of interfaces at the head end for communicating with the first plurality of network nodes, the first plurality of interfaces including a first interface and a second interface;
dynamically adjust a frequency of occurrence of initial maintenance opportunities on the first interface during the second time interval in accordance with a first insertion interval value; and
dynamically adjust a frequency of occurrence of initial maintenance opportunities on the second interface during the second time interval in accordance with a second insertion interval value.

10. The system of claim 9 being further operable to:
determine a second insertion rate estimate associated with the first interface;
determine a third insertion rate estimate associated with the second interface;
determine the first insertion interval value using the second insertion rate estimate; and
determine the second insertion interval value using the third insertion rate estimate.

11. The system of claim 8 being further operable to:
detect an occurrence of a first condition or event; and
initiate, in response to the detection of the first condition or event, at least one action for dynamically adjusting the frequency of occurrence of initial maintenance opportunities available to the first plurality of network nodes during the second time interval;
wherein the first condition or event includes at least one criteria selected from a group of criteria consisting of: a network failure, a failure at the head end, the head end being off-line, and a number of nodes currently registered at head end being below a specified minimum threshold value.

12. The system of claim 8 being further operable to:
dynamically determine, using the first insertion rate estimate, a first insertion interval value relating to a frequency of occurrence of initial maintenance opportunities available to the first plurality of network nodes during the second time interval.

13. The system of claim 8 being further operable to:
dynamically increase the first insertion interval value in response to a determination that the first insertion rate estimate is lower than a first value; and
dynamically decrease the first insertion interval value in response to a determination that the first insertion rate estimate is higher than the first value.

14. The system of claim 8 wherein said access network is a cable network implemented in accordance with a DOCSIS standardized protocol, and wherein said nodes are cable modems.

15. A cable network comprising: a Cable Modem Termination System (CMTS); a plurality cable modems; at least one interface for facilitating communication between the CMTS and plurality of cable modems; means for determining a first insertion rate estimate relating to an estimated number of cable modems attempting to sign on to the cable network during a first time interval; means for dynamically adjusting, using the first insertion rate estimate, a frequency of occurrence of initial maintenance opportunities available to a first plurality of network cable modems during a second time interval, determine a number R1 of initial ranging requests received at the head end during a second time interval; determine a number R2 of initial ranging requests received at the head end during a third time interval; and calculate the first insertion rate estimate using data relating to R1 and R2.

* * * * *